United States Patent
Marsh et al.

(10) Patent No.: US 9,563,885 B2
(45) Date of Patent: Feb. 7, 2017

(54) SYSTEMS AND METHODS FOR DUPLICATING TRANSPONDER KEYS AND MANAGING KEY INFORMATION THEREOF

(71) Applicant: KeyMe, Inc., Long Island City, NY (US)

(72) Inventors: Gregory Marsh, Granite Bay, CA (US); Kristopher Borer, New York, NY (US); Zachary Salzbank, Port Washington, NY (US); Paige Pruitt, Half Moon Bay, CA (US)

(73) Assignee: KeyMe, Inc., New York, NY (US)

( * ) Notice: Subject to any disclaimer, the term of this patent is extended or adjusted under 35 U.S.C. 154(b) by 0 days.

(21) Appl. No.: 14/792,319

(22) Filed: Jul. 6, 2015

(65) Prior Publication Data
US 2016/0004892 A1   Jan. 7, 2016

Related U.S. Application Data

(60) Provisional application No. 62/020,909, filed on Jul. 3, 2014.

(51) Int. Cl.
*H04Q 5/22*   (2006.01)
*G06Q 20/18*  (2012.01)

(52) U.S. Cl.
CPC .................... *G06Q 20/18* (2013.01)

(58) Field of Classification Search
CPC ...................................... G06Q 20/18
See application file for complete search history.

(56) References Cited

U.S. PATENT DOCUMENTS

| | | |
|---|---|---|
| 5,127,532 A | 7/1992 | Cimino et al. |
| 5,351,409 A | 10/1994 | Heredia |
| 5,545,286 A | 8/1996 | Schaupp |
| 5,617,323 A | 4/1997 | Stansberry et al. |
| 5,711,643 A | 1/1998 | Parr et al. |
| 5,807,042 A | 9/1998 | Almblad et al. |
| 5,908,273 A | 6/1999 | Titus et al. |
| 6,064,747 A | 5/2000 | Wills et al. |

(Continued)

FOREIGN PATENT DOCUMENTS

WO   WO/2012/170321   12/2012

OTHER PUBLICATIONS

"Blue Shark Computerized Key Cutter", Lockpicks.com, last accessed May 16, 2013, pp. 1-4, available at: http://www.lockpicks.com/browseproducts/Blue-SHARK-computerized-key-cutter.html.

(Continued)

*Primary Examiner* — Erin File
(74) *Attorney, Agent, or Firm* — Byrne Poh LLP

(57) ABSTRACT

Systems and methods for duplicating transponder keys and managing key information thereof are provided. In some embodiments, the system comprises: a kiosk comprising: an antenna; and at least one hardware processor is programmed to: determine that the transponder key is to be scanned; receive information related to the transponder key; retrieve signal properties for the transponder key based on the received information related to the transponder key; cause the antenna to emit a first signal; detect a second signal; receive location information; cause information encoded in the second signal to be used to create the duplicate transponder key; and cause the duplicate transponder key to be delivered based on the location information.

20 Claims, 19 Drawing Sheets

(56) References Cited

U.S. PATENT DOCUMENTS

| | | | |
|---|---|---|---|
| 6,065,911 A | 5/2000 | Almblad et al. | |
| 6,152,662 A | 11/2000 | Titus et al. | |
| 6,175,638 B1 | 1/2001 | Yanovsky | |
| 6,185,311 B1 | 2/2001 | Yanovsky et al. | |
| 6,406,227 B1 | 6/2002 | Titus et al. | |
| 6,449,381 B1 | 9/2002 | Yanovsky et al. | |
| 6,543,972 B1 | 4/2003 | Cimino | |
| 6,588,995 B2 | 7/2003 | Wills et al. | |
| 6,647,308 B1 | 11/2003 | Prejean | |
| 6,687,565 B2 | 2/2004 | Wetterlin et al. | |
| 6,801,829 B2 | 10/2004 | Kawai | |
| 6,836,553 B2 | 12/2004 | Campbell et al. | |
| 6,839,449 B1 | 1/2005 | Campbell et al. | |
| 6,839,451 B2 | 1/2005 | Campbell et al. | |
| 6,895,100 B1 | 5/2005 | Pacenzia et al. | |
| 7,437,305 B1 | 10/2008 | Kantarjiev et al. | |
| 7,761,062 B2* | 7/2010 | Mervine | G08G 1/205 455/557 |
| 7,849,721 B2 | 12/2010 | Bass et al. | |
| 7,890,878 B2 | 2/2011 | Bass et al. | |
| 7,891,919 B2 | 2/2011 | Bass et al. | |
| 8,059,883 B1 | 11/2011 | Watts | |
| 8,074,481 B2 | 12/2011 | Bass et al. | |
| 8,128,322 B2 | 3/2012 | Bass et al. | |
| 2001/0033781 A1 | 10/2001 | Wills et al. | |
| 2006/0173587 A1* | 8/2006 | Oesterling | B60R 25/00 701/2 |
| 2007/0003388 A1 | 1/2007 | Doong | |
| 2007/0096940 A1* | 5/2007 | Laranang | G06Q 10/00 340/13.24 |
| 2007/0198287 A1 | 8/2007 | Outwater | |
| 2008/0145163 A1 | 6/2008 | Freeman et al. | |
| 2009/0074528 A1 | 3/2009 | Hadad | |
| 2010/0217427 A1 | 8/2010 | Gray et al. | |
| 2010/0217428 A1 | 8/2010 | Strong et al. | |
| 2010/0278437 A1 | 11/2010 | Thompson et al. | |
| 2010/0278438 A1 | 11/2010 | Thompson et al. | |
| 2011/0167377 A1 | 7/2011 | Bass et al. | |
| 2011/0176881 A1 | 7/2011 | Bass et al. | |
| 2011/0262240 A1 | 10/2011 | Mutch et al. | |
| 2011/0297691 A1 | 12/2011 | Freeman | |
| 2011/0301738 A1* | 12/2011 | Freeman | B23C 3/35 700/106 |
| 2012/0038453 A1 | 2/2012 | Bass et al. | |
| 2012/0084182 A1 | 4/2012 | Bass et al. | |
| 2012/0173351 A1 | 7/2012 | Hanson et al. | |
| 2012/0278167 A1* | 11/2012 | Schwartz | H04M 3/02 705/14.53 |
| 2013/0017030 A1 | 1/2013 | Freeman et al. | |
| 2014/0259582 A1* | 9/2014 | Blalock | G07C 9/00857 29/76.2 |
| 2015/0050094 A1* | 2/2015 | Gerlings | E05B 19/04 409/81 |

OTHER PUBLICATIONS

Harris, C. and Stephens, M.J., "A Combined Corner and Edge Detector", In Proceedings of the Alvey Vision Conference (AVC '88), Manchester, GB, Aug. 31-Sep. 2, 1988, pp. 147-152.

International Patent Application No. PCT/US2007/024522, filed Nov. 28, 2007.
International Patent Application No. PCT/US2013/020231, filed Jan. 4, 2013.
International Search Report and Written Opinion dated Mar. 14, 2013 in International Patent Application No. PCT/US2013/020231.
Kane, D., "Keys Can Be Copied from Afar", In Jacobs School Computer Scientists Show, UC San Diego, Jacobs School of Engineering, Oct. 30, 2008, pp. 1-4, available at: http://jacobsschool.ucsd.edu/news/news-releasees/release.sfe?id=791.
Keystone 600N5, "Key and Core Control", In Stanley Security Solutions, 2006, pp. 1-4.
Keystone 600N5, "Keystone 600N5 Training Manual", In Stanley Security Solutions, vol. 3, Mar. 2007, pp. 1-170.
Keystone 600N5, "Network Key Management Software", In Stanley Security Solutions, Aug. 2006, pp. 1-2.
Keytrail, "For Complete Management of Keys, Personnel & Locations", In HPCWorld, 2005, pp. 1-6.
Laxton, B., et al. "Reconsidering Physical Key Secrecy: Teleduplication via Optical Decoding", In ACM CCS '08, Alexandria, VA, Oct. 2008, pp. 1-9.
LockViewer.com, "Core, Lock and Key Management Software", Lockviewer.com, 2009, pp. 1-2, available at: lockviewer.com.
MasterKing, "MasterKing: for Development of Superior Master Keying Systems", In HPCWorld, 2005, pp. 1-6, available at: http://www.hpcworld.com/software/w-mk35.htm.
Motorola, "Motomanual: Motoming A1200", Motorola, Inc., 2007, pp. 1-174.
Notice of Allowance dated Oct. 31, 2013 in U.S. Appl. No. 13/734,064.
Office Action dated May 30, 2013 in U.S. Appl. No. 13/734,032.
Office Action dated Jun. 14, 2013 in U.S. Appl. No. 13/734,064.
Office Action dated Sep. 1, 2015 in U.S. Appl. No. 14/747,377.
Office Action dated Sep. 9, 2013 in U.S. Appl. No. 13/734,032.
Office Action dated Dec. 23, 2014 in U.S. Appl. No. 14/169,981.
Otsu, N., "A Thresholding Selection Method from Gray Level Histogram," In Proceedings of the IEEE Transactions on Systems, Man, Cybernetics (SMC '79), Jan. 1979, pp. 62-66.
U.S. Appl. No. 13/734,032, filed Jan. 4, 2013.
U.S. Appl. No. 13/734,064, filed Jan. 4, 2013.
U.S. Appl. No. 13/743,053, filed Jan. 16, 2013.
U.S. Appl. No. 60/867,403, filed Nov. 28, 2006.
U.S. Appl. No. 60/867,796, filed Nov. 30, 2006.
U.S. Appl. No. 61/582,990, filed Jan. 4, 2012.
U.S. Appl. No. 61/602,456, filed Feb. 23, 2012.
U.S. Appl. No. 61/656,832, filed Jun. 7, 2012.
U.S. Appl. No. 61/683,794, filed Aug. 16, 2012.
U.S. Appl. No. 61/691,396, filed Aug. 21, 2012.
Express Auto Keys Online Shop—Car and Motorbike Keys Cut to Number or Photo, WayBack Machine Internet Archive, http://www.keysinthepost.com, captured Dec. 5, 2011, pp. 1-2.
Office Action dated Jun. 7, 2016 in U.S. Appl. No. 14/747,377.
Office Action dated Dec. 16, 2015 in U.S. Appl. No. 14/747,377.

* cited by examiner

SYSTEMS AND METHODS FOR DUPLICATING TRANSPONDER KEYS AND MANAGING KEY INFORMATION THEREOF

CROSS-REFERENCE TO RELATED APPLICATIONS

This application claims the benefit of U.S. Provisional Patent Application No. 62/020,909, filed Jul. 3, 2014, which is hereby incorporated by reference herein in its entirety.

TECHNICAL FIELD

The disclosed subject matter relates to systems and methods for duplicating transponder keys and managing key information thereof.

BACKGROUND

Keys that include a transponder are often used for limiting access to and/or the use of places (e.g., homes, places of business, storage, etc.) and other types of property (e.g., vehicles, etc.) to a person in possession of a key that can operate the lock/ignition and/or that includes a transponder that sends a signal that is accepted by the lock/ignition. A problem arises when a person who would normally be authorized to enter or use the property protected by the lock/ignition does not have physical access to the appropriate key. For example, if a user locks themselves out of their home with the key inside, they cannot gain access to the home because they do not have access to the key. As another example, if a user loses a key to a car, the user cannot use the car. One way that users solve the problem is by ordering a new key from a manufacturer of the lock/ignition and/or property that includes the lock/ignition. However, replacement keys from the manufacturer are often very expensive and may be inconvenient to procure. For example, in the case of a car key, the user may have to call or visit a dealership, which may have to order a new key from the manufacturer. Another way that users solve the problem is by using a locksmith with the proper equipment to create a spare key based on an existing key. However, locksmiths are expensive and may not be readily available when the user is in need. The locksmith also often requires a physical copy of the key, especially in the case of automobile keys, which tend to be more complicated than many other types of keys.

Therefore, there is a need for mechanisms for duplicating keys that do not require the services of a skilled locksmith or ordering a replacement from the manufacturer and are secure, among other things.

SUMMARY

In accordance with various embodiments of the disclosed subject matter, systems and methods for duplicating transponder keys and managing key information thereof are provided.

In accordance with some embodiments of the disclosed subject matter, a system for scanning a transponder key is provided, the system comprising: a kiosk comprising: an antenna; and at least one hardware processor that is programmed to: determine that the transponder key is to be scanned; receive information related to the transponder key; retrieve signal properties associated with the transponder key based on the received information related to the transponder key; cause the antenna to emit a first signal based on the retrieved signal properties; detect a second signal based on the retrieved signal properties in response to causing the antenna to emit the first signal; receive an instruction to create a duplicate of the transponder key; receive location information to which the duplicate of the transponder key is to be delivered; cause information encoded in the second signal to be used to create the duplicate transponder key; and cause the duplicate transponder key to be delivered based on the location information.

In accordance with some embodiments of the disclosed subject matter, a method for scanning a transponder key is provided, the method comprising: determining that a transponder key is to be scanned; receiving information related to the transponder key; retrieving signal properties associated with the transponder key based on the received information related to the transponder key; causing an antenna to emit a first signal based on the retrieved signal information; detecting a second signal based on the retrieved signal properties in response to causing the antenna to emit the first signal; receiving an instruction to create a duplicate of the transponder key; receiving location information to which the duplicate of the transponder key is to be delivered; causing information encoded in the second signal to be used to create the duplicate transponder key; and causing the duplicate transponder key to be delivered based on the location information.

In some embodiments, the method further comprises confirming that a position of the transponder key is within a threshold distance of the antenna based on the retrieved signal properties.

In some embodiments, the method further comprises: receiving an image of the transponder key captured by an image sensor included in the key scanner; determining geometric information about the transponder key based on an image of the transponder key captured by the image sensor; and causing the geometric information about the transponder key to be used to create the duplicate transponder key.

In some embodiments, the transponder key is a key for an automobile and the information related to the transponder key includes the make, model and year of the automobile.

In some embodiments, the location information includes at least a mailing address.

In some embodiments, the method further comprises: causing the information encoded in the second signal to be stored in a storage device in association with the geometric information; and causing the information encoded in the second signal and the geometric information about the transponder key to be retrieved from the storage device.

In some embodiments, the method further comprises determining the information encoded in the second signal.

In some embodiments a system for duplicating a transponder key is provided, the system comprising: at least one hardware processor that is programmed to: receive, from a kiosk, a request for signal properties for interrogating a transponder key; receive, from the kiosk, information about the transponder key; determine signal properties associated with the transponder key using the information about the transponder key, wherein the signal properties include at least a format of a signal that is used to activate the transponder key; send, to the kiosk, the signal properties associated with the transponder key; receive, from the kiosk, encoded information included in a signal received by the kiosk from the transponder key; receive location information; identify a key blank based on the information about the transponder key; create a duplicate of the transponder key using the encoded information; and cause the duplicate key to be delivered based on the location information.

In some embodiments, the location information is received from the kiosk.

In some embodiments, the location information is retrieved from a storage device based on identifying information received from the kiosk.

In some embodiments, the hardware processor is further configured to: receive identifying information from the kiosk that identifies a user; and store the encoded information in a storage device in association with an account of the user.

In some embodiments, hardware processor is further programmed to program a transponder chip in the key blank based on the encoded information.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

In accordance with various embodiments, systems and methods for managing key information are provided.

In some embodiments, these systems and methods allow a user to create a copy of a key. For example, a user can create a copy of a key if the key has been lost, if the user wishes to make a copy for a friend, or for any other suitable reason. In order to do so, in some embodiments, these systems and methods can detect a bitting pattern and a blank type of a user's key. This bitting pattern, blank type, and any other suitable information can then be stored in any suitable storage mechanism. At a suitable subsequent point in time (such as when the user has lost the key), these systems and methods can generate a duplicate of the key without the presence of the original key. This can be accomplished by retrieving the stored information from storage, selecting a blank key corresponding to the blank type, cutting the blank key according to the bitting pattern, and dispensing the key to the user. Any suitable security mechanisms can be included in these systems and methods to prevent unauthorized key duplication.

One of the uses of such systems and methods can be to provide a user with a way of creating a duplicate key when the original is not available, for instance during a lockout situation. Another use of these systems and methods can allow a user to obtain a duplicate key in a self-service fashion without assistance from, for example, a skilled locksmith or an employee at a hardware store that duplicates keys. Additionally, the systems and methods can be used to verify user identification through biometric scanning to provide a secure method for duplicating sensitive keys (e.g., a home key, a vehicle key, etc.).

Figure 1:
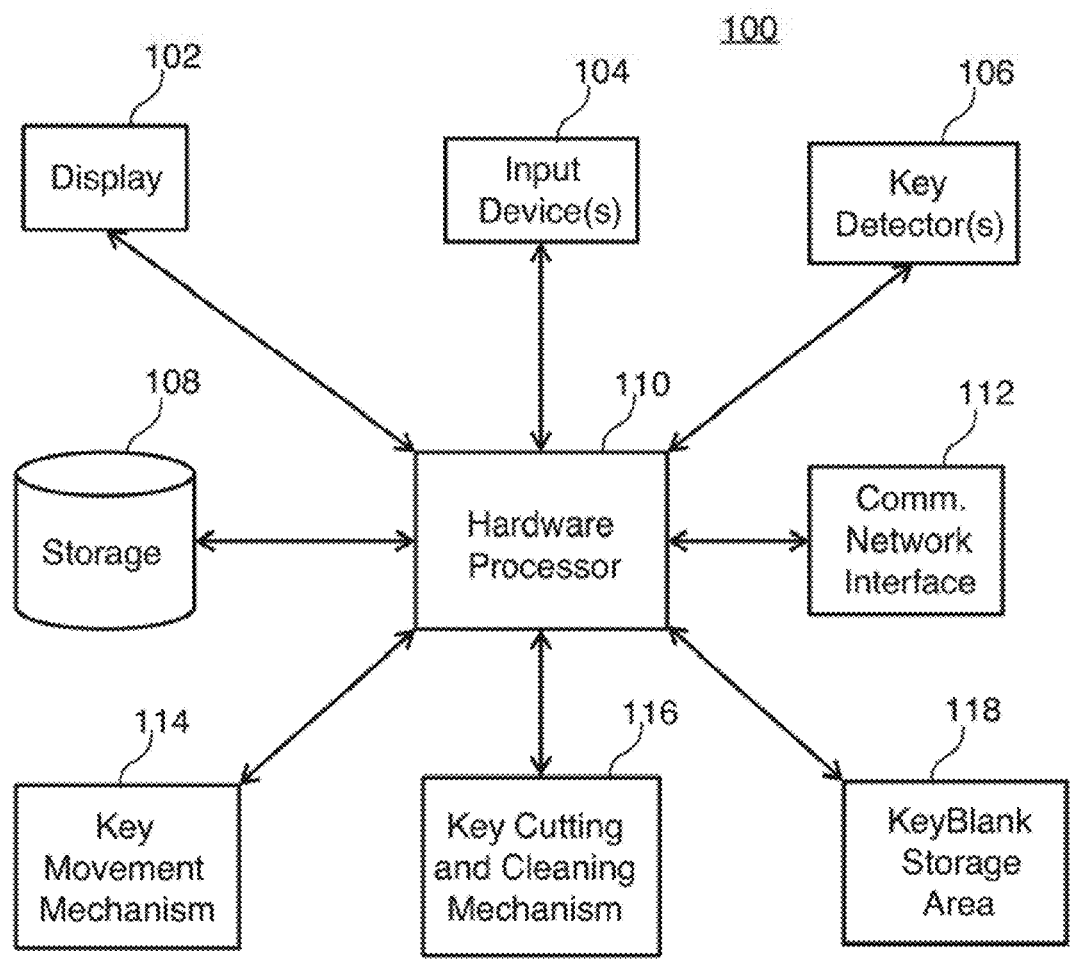
FIG. 1 shows an illustrative example of a schematic diagram of a system for duplicating keys in accordance with some embodiments of the disclosed subject matter.

Turning to FIG. 1, an example of hardware 100 that can be used in some embodiments is illustrated. As shown, hardware 100 can include a display 102, one or more input device(s) 104, one or more key detector(s) 106, storage 108, a hardware processor 110, a communication network interface 112, a key movement mechanism 114, a key cutting and cleaning mechanism 116, and/or any other suitable components.

Figure 2:
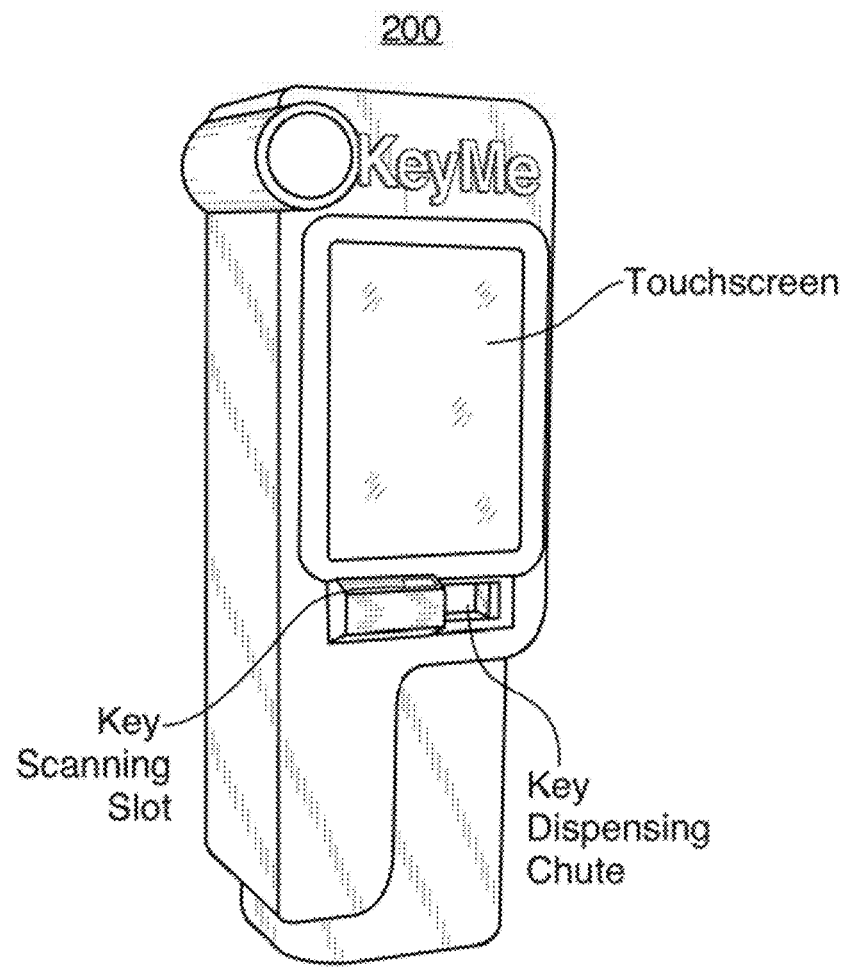
FIG. 2 shows an illustrative example of a perspective view of a kiosk for duplicating keys in accordance with some embodiments of the disclosed subject matter.

This hardware can be arranged in any suitable manner in some embodiments. For example, this hardware can be arranged in a kiosk, such as kiosk 200 of FIG. 2, in some embodiments.

In some embodiments, a subset of the hardware shown in FIG. 1 can be implemented in a scan-only kiosk that can be used to save a key template but not to create a key copy. For example, such a kiosk can omit mechanisms 114, 116, and 118 in some embodiments.

Display 102 can be any suitable display, such as an LCD display, a cathode ray tube display, an electronic paper display, etc. Input device(s) 104 can include any suitable input devices, such as a keypad, a keyboard, a fingerprint reader, an eye scanner (e.g., a retina or iris scanner), a touchpad, a credit card scanner, a smart card reader, a near field communication device, an RFID scanner, a touch sensor, a camera, a Quick Response code (QR code) reader, a barcode reader, etc. In some embodiments, display 102 and an input device 104 can be combined as a touch sensitive display (or touchscreen device).

Key detector 106 can be any suitable mechanism for detecting the bitting pattern and/or the blank type of a key. For example, the key detector can be any suitable device that detects the bitting pattern and/or blank type of a key using any suitable technology such as optical technologies, mechanical technologies, electrical technologies, and/or any other technology, as described further below. More generally, key detector 106 can detect geometric information about a key. For example, key detector 106 can detect the dimensions of a key (e.g., length, width, height, profile, shoulder shape, etc.) and features of the key. Examples of features of the key can include, but are not limited to, a bitting pattern, protuberances, dimples, voids, grooves, a milling profile, a milling pattern of the key from one or more side views, a milling pattern of the key from a front view (e.g., looking from the tip of the key toward the head of the key), etc.

In some embodiments, key detector 106 can detect the presence of an instruction to not duplicate the key. For example, such an instruction can be printed or engraved on a key by words, such as, "do not duplicate." As another example, such an instruction can be embedded in the key as an RFID chip, or the like. As another example, such an instruction can be indicated by the presence of a physical indication to not copy the key. For instance, a notch can be cut in the top of the key, or material can added to a portion of the key that is not inserted into a lock. In such embodiments, the presence of an instruction to not duplicate the key can cause the mechanisms described herein to inhibit scanning and/or duplication of the key as described herein.

Storage 108 can be any suitable storage. For example, storage 108 can be random access memory (RAM), electrically erasable programmable read only memory (EEPROM), flash memory, disk memory, network storage, a database, any other suitable storage, or any suitable combination thereof.

Hardware processor 110 can be any suitable processing hardware. For example, hardware processor 110 can be a microprocessor, a microcontroller, dedicated logic, a field programmable gate array, a general purpose computer, a special purpose computer, a client, a server, and/or any other suitable processing hardware.

Communication network interface 112 can be any suitable interface facilitating communications on a communication network. For example, communication network interface can be a wired network interface (such as an Ethernet network interface card (NIC), a USB interface, a cable television network interface, a telephone network interface, etc.), a wireless network interface (such as an IEEE 802.11x interface, a Bluetooth interface, a mobile telephone interface, a wireless data network interface, a satellite communications interface, etc.), an optical interface, and/or any other suitable interface.

Key movement mechanism 114 can be any suitable mechanism for moving a key from a key blank storage area 118 to key cutting and cleaning mechanism 116. For example, key movement mechanism 114 can include a key blank holding mechanism connected to one or more belts and/or stabilizer bars in which the position and operation of the gripper is controllable by hardware processor 110 and/or any other suitable mechanism. As another example, key movement mechanism 114 can be a robotic arm that is controllable by hardware processor 110 and/or any other suitable mechanism. Additionally or alternatively, as described in more detail below in connection with FIG. 11, key movement mechanism 114 can include a funnel and/or alignment mechanism that receives a key blank from a stack and positions the key blank to be moved to key cutting and cleaning mechanism 116.

In some embodiments, key blank storage 118 can house an inventory of any suitable number of types of key blanks (sometimes referred to herein as "blanks"). In some embodiments, keys of each blank type (e.g., key blanks with different milling patterns, key blanks of different sizes, etc.) can be stored in stacks within the storage area. Each stack can include any suitable number of blanks. Inventory levels of blanks can be monitored (locally or remotely) to keep track of how many key blanks are remaining in each stack. In some embodiments, each stack can have one or more sensors which can be used to determine how many blanks remain in the stack. In some embodiments, in response to sensing that the number of blanks in a stack (or the number of blanks of a certain type) has fallen below a threshold, a technician can be alerted and dispatched to add blanks. The technician can be alerted using any suitable communication method. For example, an email, a text message or a voice message can be sent to the technician. As another example, a message can be sent to the technician using a specialized application that includes software for managing inventory levels of key blanks.

In some embodiments, blanks can be removed from a stack as needed by key movement mechanism 114. For example, the magazines holding stacks of inventoried key blanks can be aligned vertically, in some embodiments. This can allow for key blanks to be fed to the bottom of the magazine by gravity as key blanks are removed by key movement mechanism 114. If the stacks are aligned vertically, the blank on the bottom of each stack can be removable by key movement mechanism 114. In an alternative example, if the stacks are aligned vertically, the blank at the top of each stack can be removable by key movement mechanism 114. In yet another example, key movement mechanism 114 can remove a blank from an arbitrary position in each stack. In some embodiments, stacks can be arranged in any suitable orientation, such as horizontally.

In some embodiments, a magazine can hold the stacks of inventories blanks. These magazines can be, for example, a storage and feeding device for holding a stack of inventory blanks. The magazines for holding the stacks of inventory can be made from any suitable material, such as: steel, aluminum, plastic, rubber, carbon fiber, etc. The magazines can be shaped to facilitate selection and removal of key blanks from the stack of blanks by key movement mechanism 114. In some embodiments, the magazines can be replaceable in a housing that houses hardware 100 to facilitate placement of blanks for use by allowing multiple keys to be placed at the same time. For example, if a technician is alerted that an inventory of a particular type of blank is below a threshold, the technician can refill the inventory of the particular type of blank.

Figure 9A:
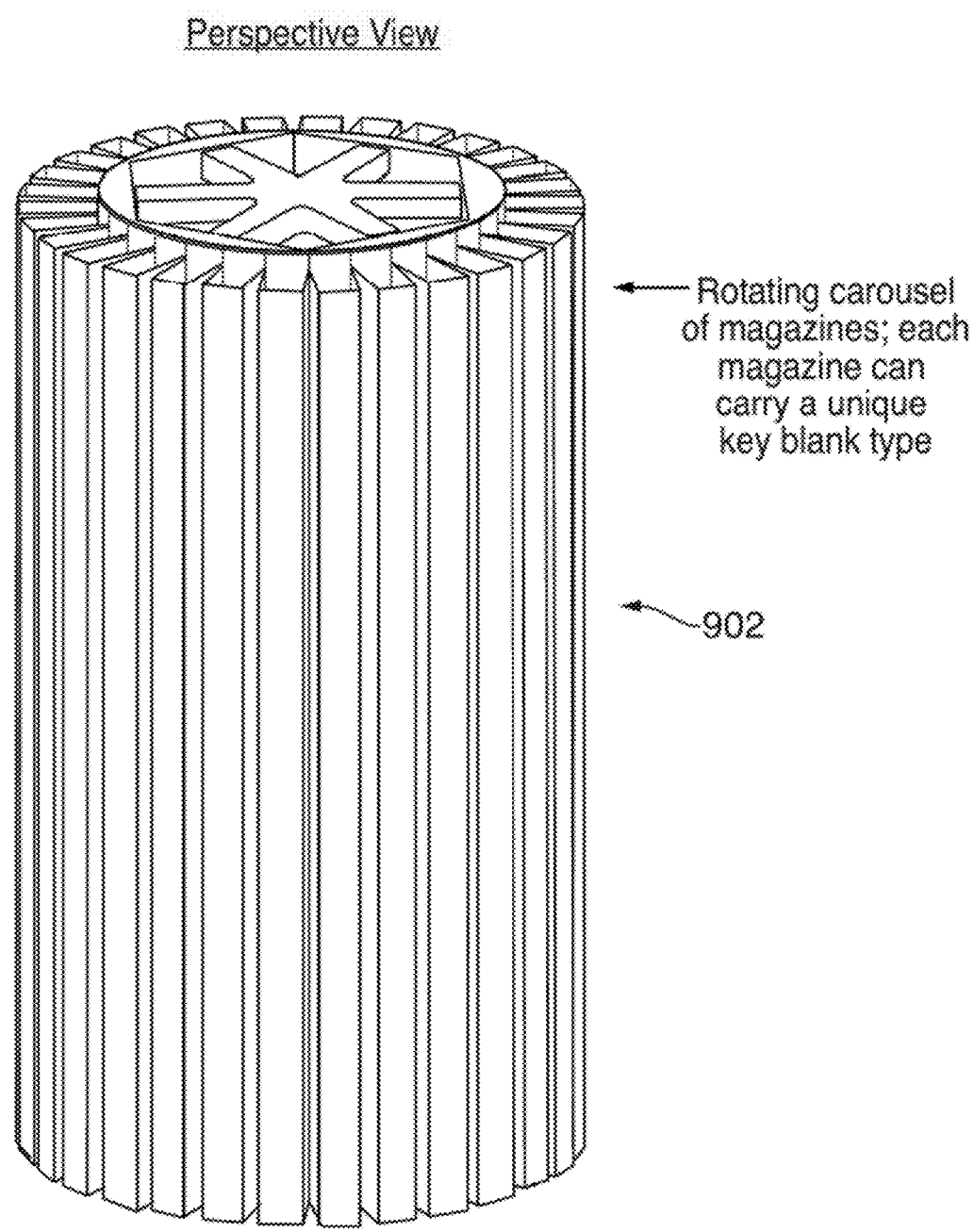
FIG. 9A shows an illustrative example of a rotating carousel of magazines for use in a key duplicating system in accordance with some embodiments of the disclosed subject matter.
Figure 9B:
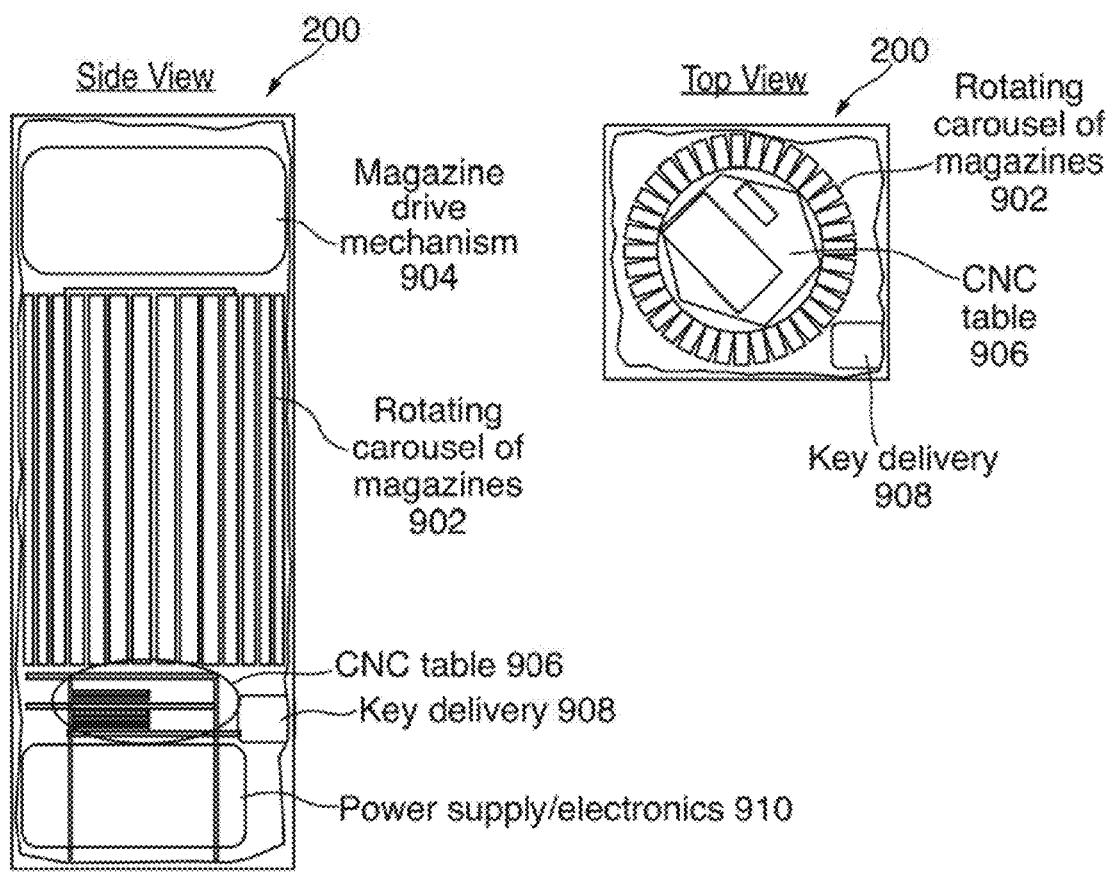
FIG. 9B shows an illustrative example of a rotating carousel of magazines installed in a system for duplicating keys in accordance with some embodiments of the disclosed subject matter.

In some embodiments, the magazines holding stacks of inventoried key blanks can be placed on a rotating carousel. An illustrative example is shown in FIGS. 9a and 9b. Such an embodiment can allow for a greater number of magazines, and correspondingly unique key types, within a given kiosk volume compared with a mounted set of static magazines. Alternatively, key movement mechanism 114 can rotate to reach surrounding magazines to achieve a similar result of accommodating a large number of magazines inside the small interior of a kiosk, in some embodiments.

Figure 10:
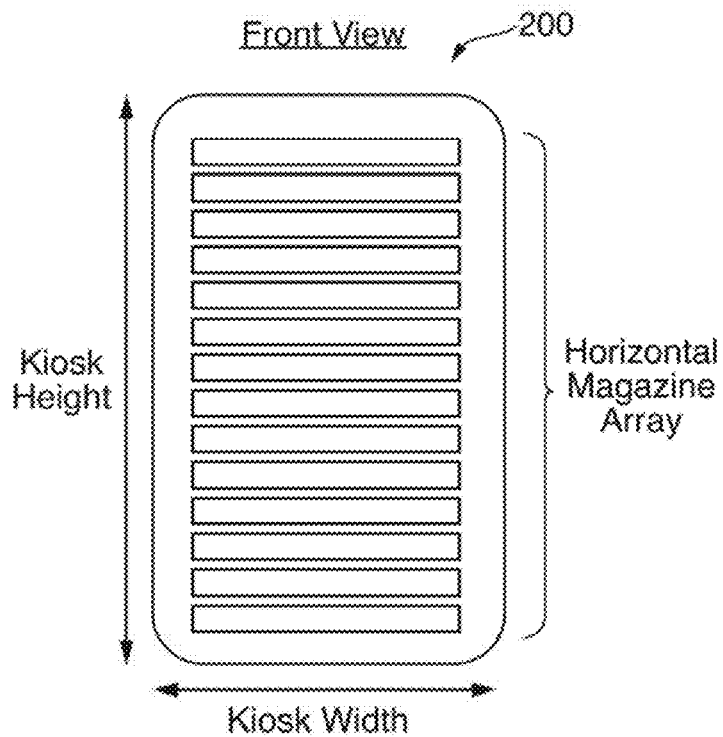
FIG. 10 shows an illustrative example of a kiosk with horizontally installed magazines in accordance with some embodiments of the disclosed subject matter.

In some cases in which the kiosk height is greater than its width, for example, magazines can be aligned horizontally so that the number of magazines which can be accommodated is increased in some embodiments. This can allow for more types of keys to be stocked, for example, in a kiosk having a limited footprint. An illustrative example is in FIG. 10. In some embodiments, a passive push mechanism (e.g., a spring or springs) or active push mechanism (e.g., a screw mechanism, a conveyer, etc.) can apply pressure to the horizontally stacked key blanks and the blanks can be retrievable by key movement mechanism 114 at one or both sides of each stack.

Figure 11A:
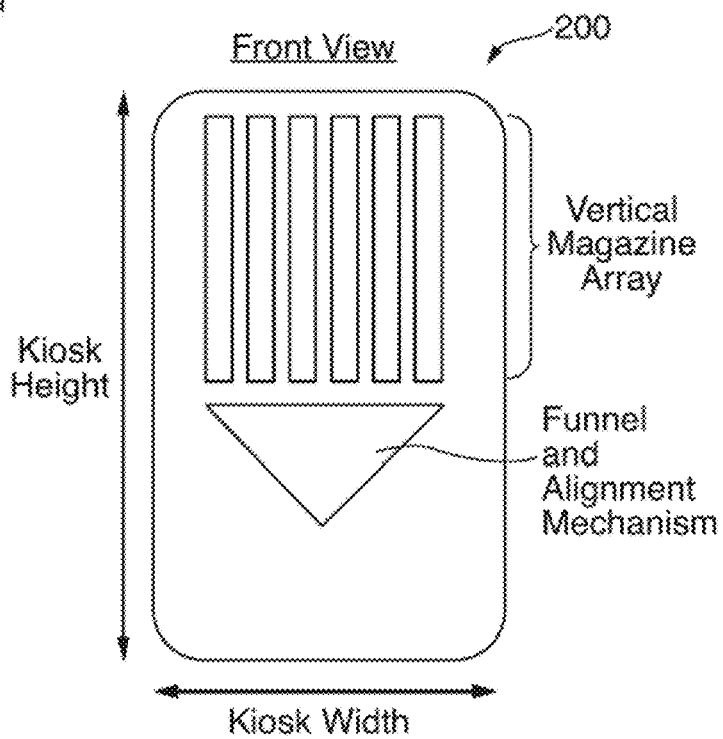
FIG. 11A shows an illustrative example of a kiosk with vertically installed magazines and a funnel and alignment mechanism in accordance with some embodiments of the disclosed subject matter.
Figure 11B:
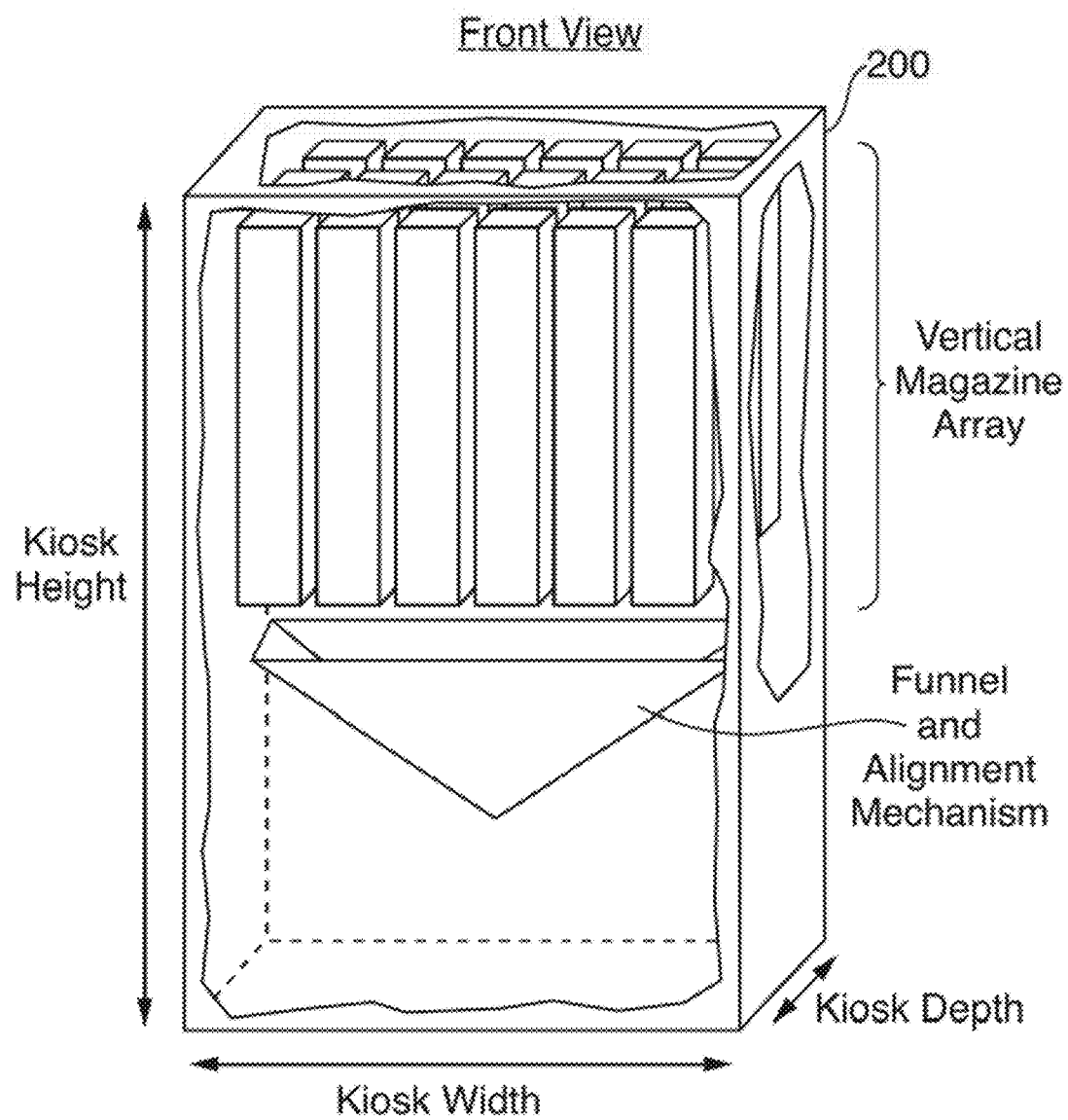
FIG. 11B shows an illustrative example of a perspective view of a kiosk with multiple rows of vertically installed magazines and a funnel and alignment mechanism in accordance with some embodiments of the disclosed subject matter.

In some embodiments, key blanks can be dispensed from the magazines (using any suitable mechanism) into a funnel and alignment mechanism where they can be properly oriented and then retrieved by key movement mechanism 114. It should be noted that the funnel and alignment mechanisms along with mechanisms for dispensing blanks from the magazines can be thought of as part of key movement mechanism 114, in some embodiments. An illustrative example is shown in FIG. 11A. Such a method can allow for significant freedom in the placement of magazines within the kiosk, so that a large number of magazines can be accommodated. For example, magazines can be arranged in a two dimensional array. FIG. 11B shows an illustrative example of a perspective view of kiosk 200 in which the vertical magazines can be arranged in rows from one side of kiosk 200 to the other and in rows from the front of kiosk 200 toward the back of kiosk 200. Alternatively, the magazines can be arranged in any suitable configuration that allows blanks stored in the magazines to be dispensed into the funnel and alignment mechanism included in key movement mechanism 114 to be oriented and then retrieved by a key gripping and moving mechanisms that is included in key movement mechanism 114.

Figure 12:
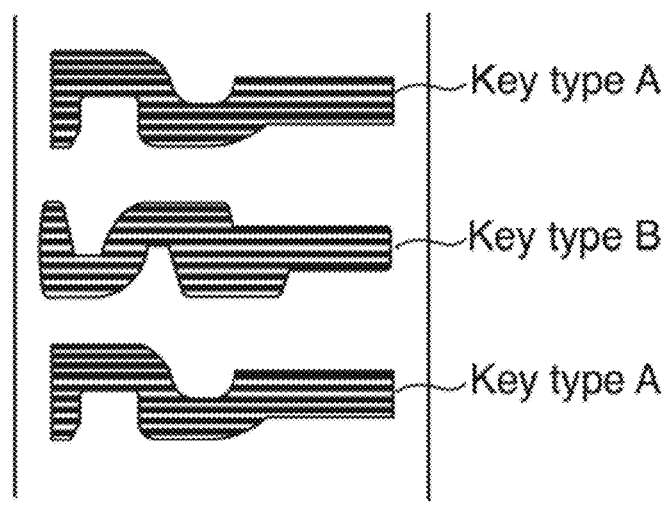
FIG. 12 shows an illustrative example of different key types arranged in one magazine in accordance with some embodiments of the disclosed subject matter.
Figure 12:
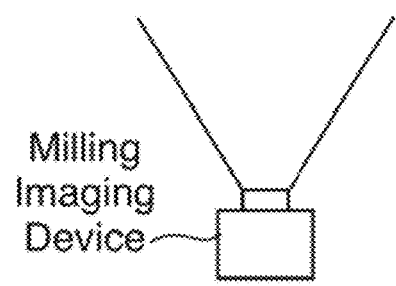

In some embodiments, each magazine can contain an inventory of multiple key types so that the number of magazines does not restrict the number of key types which can be accommodated in a kiosk. An illustrative example is shown in FIG. 12. In this embodiment, a key type detection method (e.g., optical imaging), can be used to identify the location of a given blank type within a magazine. Key movement mechanism 114 can then retrieve a required key blank type from an appropriate location within the magazine.

Key cutting and cleaning mechanism 116 can be any suitable mechanism for cutting and cleaning a key. For example, key cutting and cleaning mechanism 116 can include a key blank holding mechanism, a cutting tool, a deburring tool, a scrap metal guard and debris container, and/or any other suitable key cutting and/or key cleaning device. In some embodiments, various parts described herein can be part of a computer numerical control (CNC) machine used to create a duplicate key. For example, mechanisms 114 and 116 combined can together be part of a CNC machine that can be precisely controlled. For example, such a CNC machine can have a key blank holding mechanism attached one or more belts and/or stabilizing bars that can receive a blank key from key storage area 118. The key blank holding mechanism of the CNC machine can then be moved with the blank key to a cutting blade of the cutting tool under the control of the hardware processor and cause the key to be cut according to specifications. After a key is cut, the CNC machine can then move the blank key to the deburring tool to be cleaned of burrs that can result from the cutting process. After deburring is complete, the holding mechanism can release the new key into a key dispensing chute where it can be retrieved by the user.

As another example, mechanism 116 can include a CNC machine having a robotic arm that can be precisely controlled. A key blank holding mechanism can be attached to the end of such a robotic arm that can be used to retrieve a key from key movement mechanism 114 (e.g., the funnel and alignment mechanism described above). The robotic arm of the CNC machine can then move the blank key to a cutting blade of the cutting tool under the control of the hardware processor and cause the key to be cut according to specifications. After a key is cut, the CNC machine can then move the blank key to the deburring tool to be cleaned of burrs that can result from the cutting process. After deburring is complete, the holding mechanism can release the new key into a key dispensing chute where it can be retrieved by the user.

A scrap metal guard and debris container can include one or more flaps surrounding the cutting blade. These flaps can contain and direct scrap metal generated during the cutting process to the scrap metal container. This container can be located below the cutting tool. The container can be easily accessible to facilitate convenient removal of scrap metal during routine maintenance.

In some embodiments, a key can be replicated by an additive manufacturing process such as three-dimensional printing, whereby a new key is fabricated by laying successive layers of an inventoried material to the desired specifications. Such a technique can allow for the duplication of a large number of different key types and can negate the need for inventoried blank keys.

In some embodiments, keys can be replicated from a sheet, bar or coil of metal (generally referred to herein as "stock"). For example, material to create a new key can be removed from the stock as needed. Any suitable technique can be used for removing a required amount of material from the stock to create a new key. For example, a required amount of material can be removed from the stock by stamping. As another example, a required amount to material can cut from the stock using any suitable technique (e.g., cut with a blade, milled, cut with a laser, cut with a plasma tool, a water jet cutting tool, etc.). The material removed from the stock can then be shaped into a new key using any suitable techniques. For example, the CNC machine described above can be used to shape a new key from material removed from the stock. Such a technique can allow for the duplication of a large number of different key types and can negate the need for inventoried blank keys.

In some embodiments, keys can be replicated from a material such as hard plastic (e.g., thermoplastics or thermosetting polymers, such as, polyethylene, polypropylene, polystyrene, polyvinyl chloride, and polytetrafluoroethylene, etc., polyvinyl chloride (PVC), or any other suitable plastic). In such an embodiment, a block (or blocks) of such a plastic can be stored to be used to replicate keys. A required amount of material for replicating a key can be removed from the block as required and can be shaped into an appropriate shape for replicating a particular key. Such a technique can allow for the duplication of a large number of different key types and can negate the need for inventoried blank keys. In other embodiments, key blanks can be made of plastic rather than metal. Using plastic rather than metal to replicate keys can allow for keys to be replicated that can be easily and safely disposed of by a user after the key has fulfilled a particular purpose. For example, if the user gets locked out of their home, the user can create a replica key from plastic and retrieve the original key. The user can then dispose of the plastic replica key (e.g., by cutting up or shredding the key) so that there are not multiple unused copies of the key for the user to keep track of Using plastic can also allow for keys to be more easily created as shaping plastic is generally easier than shaping metal.

Any suitable material can be used for replicating keys using the mechanisms described herein.

In some embodiments, a user can supply an appropriate key blank for replicating a particular key. In such an embodiment, a user can determine a type of key blank required for replicating a particular key and obtain that type of key blank to use in replicating the key. For example, the user can look up the type of key blank using a computer application, mobile application, or web platform. In some cases a user can buy a blank of the required type at a retail location (e.g., a hardware store), or blanks can be available at a location where the kiosk for replicating keys is located where the user can select a key blank herself or acquire the appropriate blank from an attendant (e.g., a clerk). When the user has acquired the appropriate blank type, the user can supply the blank to the mechanism for replicating the key. In such an embodiment, the mechanism can verify that the blank supplied by the user is the correct type of blank for the particular key to be replicated. This can be done by capturing one or more images of the blank, or by using any other suitable technique for determining the properties of the blank, such as the techniques for determining the properties of a key described herein. Such a technique can allow for the duplication of a large number of different key types and can negate the need for inventoried blank keys.

Figure 3:
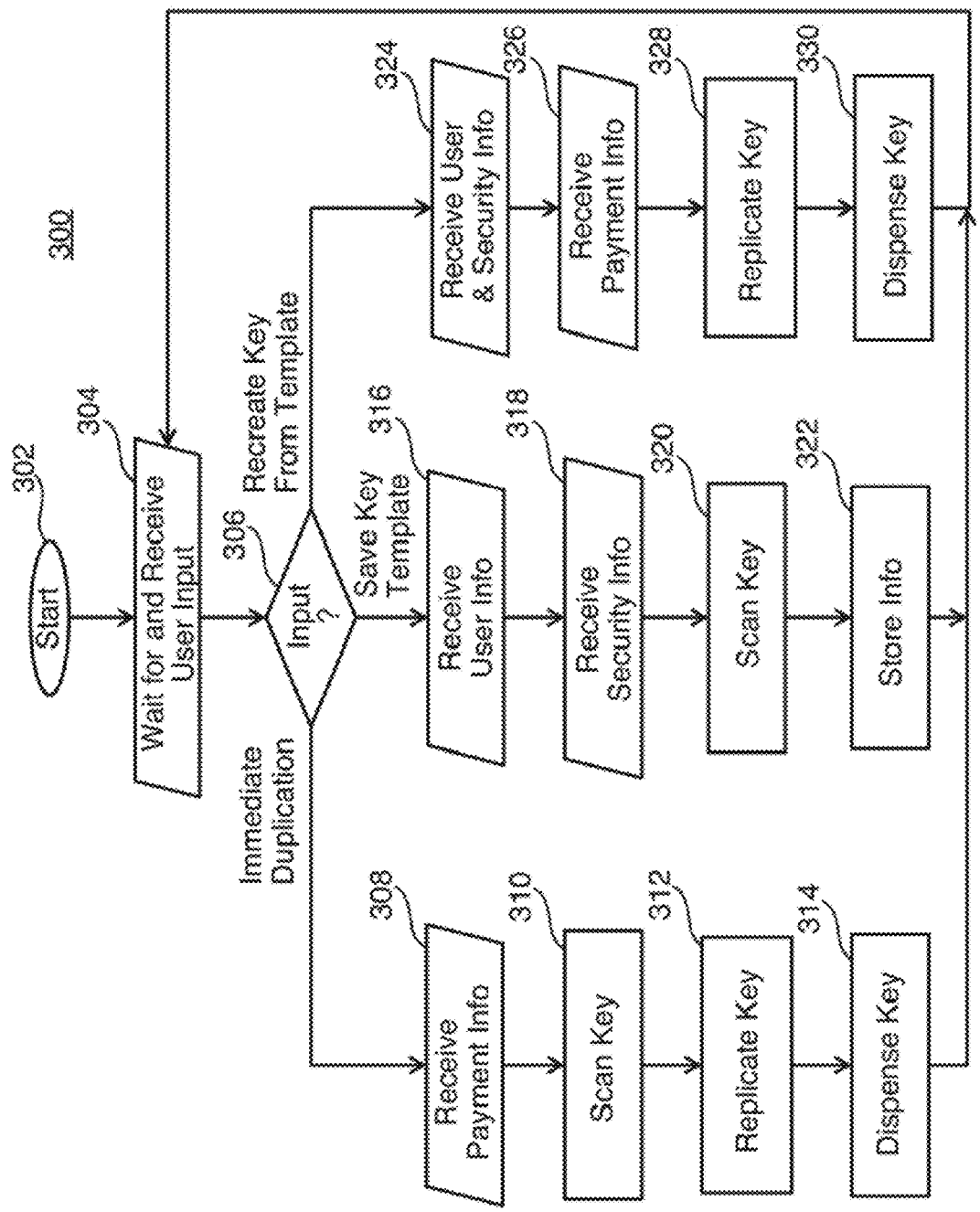
FIG. 3 shows an illustrative example of a process for duplicating keys in accordance with some embodiments of the disclosed subject matter.

Turning to FIG. 3, an example of a process 300 that can be used to control the creation of keys by hardware, such as hardware 100 of FIG. 1, is illustrated in accordance with some embodiments. This process can be executed in hardware processor 110.

As shown, after process 300 begins at 302, the process can receive a user input of an action to be taken. For example, in some embodiments, this action can be to immediately create a duplicate of a key, to save a template of a key, or to recreate a key from a template. Any other actions can additionally or alternatively be taken in some embodiments.

This user input can be received in any suitable manner. For example, in some embodiments, this user input can be specified by the user pressing a button on a touch screen interface, by a user inserting a key in to a key detector, by a user swiping a finger on a fingerprint reader or scanning an eye with a retina scanner, and/or by the user taking any other suitable action.

If the user selects to immediately duplicate a key, then process 300 can branch at 306 to 308 where payment information can be received. Any suitable mechanism for receiving payment information can be used. For example, in some embodiments, credit card information can be entered via user input device(s) 104. As another example, in some embodiments, an electronic device (such as a mobile phone) can be brought into proximity or tapped against a user input device 104. As yet another example, payment information can be received as an electronic message received via communication network interface 112. As still another example, input device(s) 104 can scan an image presented by the user that contains payment information such as an account number, etc. In such an example, the payment information can be encoded in the image so that it is difficult or impossible for a human to discern the payment information with the naked eye.

Next, at 310, process 300 can scan a key presented by the user. Any suitable approach to scanning a key can be used in some embodiments. For example, a key can be scanned as described below in connection with FIGS. 4-7. This key scanning can detect the key bitting pattern and/or the key blank type in some embodiments.

Then, at 312, process 300 can replicate the scanned key. This replication can be performed in any suitable manner. For example, in some embodiments, the key can be replicated by the hardware processor 110: (a) controlling the key movement mechanism 114 to retrieve an appropriate key blank from a key repository and move the key to the key cutting and cleaning mechanism 116; and (b) controlling the key cutting and cleaning mechanism 116 to cut the key according to the detected bitting pattern and then clean the key to remove burrs, etc.

Finally, at 314, the process can cause the key to be dispensed to a user. For example, the hardware processor can control the key cutting and cleaning mechanism 116 to drop the key in the key dispensing chute.

If the user selects to save a key template, then process 300 can branch at 306 to 316 where user information can be received. Any suitable user information can be received, and this information can be received in any suitable manner, in some embodiments. For example, in some embodiments, a user name, a key name, a user physical address, a user phone number, a user credit card number, a user identification number (e.g., social security number, driver's license number, passport number, etc.), a user name, a user email address, and/or any other suitable user information can be received using one or more user input device(s) 104. In some embodiments, receiving user information can be omitted from process 300.

At 318, process 300 can then receive security information. Any suitable security information can be received and this information can be received in any suitable manner, in some embodiments. For example, in some embodiments, a user password, a user spoken word, a user fingerprint scan, a user retina or iris scan, a face image, a DNA sample, a palm print, a hand geometry measurement and/or any other suitable security information can be received using one or more user input device(s) 104. In some embodiments, receiving security information can be omitted from process 300.

Next, at 320, process 300 can scan a user's key. Any suitable approach to scanning a key can be used in some embodiments. For example, a key can be scanned as described below in connection with FIGS. 4-7. This key scanning can detect the key bitting pattern and/or the key blank type in some embodiments.

Finally, at 322, the information received at 316, 318, and/or 320 can be stored. This information can be stored in any suitable manner and at any suitable location. For example, in some embodiments, this information can be stored in storage 108. As another example, in some embodiments, this information can be transmitted via communication network interface 112 to a remote storage device. As yet another example, in some embodiments, some information can be stored locally and some information can be stored remotely. In some embodiments, any suitable security procedures can be performed in connection with storing the information. For example, in some embodiments, the information can be encrypted prior to being stored. The information stored at 322 can then later be accessible by the same hardware and/or any other suitable hardware. For example, if a first kiosk is used to save a key template, a second kiosk can be configured to recreate a key from that template in some embodiments. Such a second kiosk can be nearby or remote from the first kiosk.

In some embodiments, a user can have the option to save key information after immediately creating a duplicate key. In such a case, if a user elects to save the key information, similarly to what is described above in connection with 316, 318, and 322, the user can be prompted to enter user information and/or security information and that information, along with the bitting pattern and key blank type information, can be stored. If a user does not choose to save key information after immediate duplication, or if the option to do so is not presented to the user, the key information can be deleted to protect the security of the user.

In some embodiments, information on a key type and bitting information of a key provided by the user can be sent to the user in addition to, or instead of, being stored in storage device 108. For example, the information can be sent to the user by e-mail, text message, mail, or any other suitable manner of sending the information. This can allow for a user to have access to the information on the type of key and bitting information without relying on storage 108. In a case where the information is not stored in storage 108, this can allow a user that is especially concerned with privacy to know that information required to create a replica of the key is not stored with personal information of the user.

In some embodiments, when a key is scanned at 320, an anonymous entry can be created corresponding to the key and the entry can be assigned an index number. The index number, bitting information, key type information, and/or information entered by a user (e.g., a password, a pin number, etc.) can be used to create a unique number that corresponds to the key. The user can then use the unique number to obtain a replica of the key, or give the unique number to another user so that the second user can obtain a replica of the key. This can allow for a user that is especially concerned with privacy to know that information required to create a replica of the key is not stored with personal information of the user, because the entry corresponding to the key is anonymous.

In some embodiments, a user can have the option to immediately create a duplicate key after saving a key template. In such a case, if a user elects to create a duplicate key, similarly to what is described above in connection with 308, 312, and 314, the user can be prompted to enter payment information and the key can be replicated and dispensed.

If the user selects to recreate a key from a template (e.g., because the user has lost his or her key), then process 300 can branch at 306 to 324 where user and security information can be received. Any suitable user information and/or any suitable security information can be received, and this information can be received in any suitable manner, in some embodiments. For example, this information can be received to securely identify the user and/or the key. More particularly, this information can include a user name and a password, a fingerprint scan, a face image capture, a credit card swipe, a key name for a previously stored key template, any other suitable information, or any suitable combination thereof. As an even more particular example, the user can be prompted to select a key from the list of those that were previously stored. Such a list can include descriptive names entered during a key template storage process, key images, etc.

Next, at 326, payment information can be received. Any suitable mechanism for receiving payment information can be used. For example, in some embodiments, credit card information can be entered via user input device(s) 104. As another example, in some embodiments, an electronic device (such as a mobile phone) can be brought into proximity or tapped against a user input device 104. As yet another example, payment information can be received as an electronic message received via communication network interface 112.

Then, at 328, process 300 can replicate the desired key. This replication can be performed in any suitable manner. For example, in some embodiments, they key can be replicated by the hardware processor 110: (a) controlling the key movement mechanism 114 to retrieve an appropriate key blank from a key repository and move the key to the key cutting and cleaning mechanism 116; and (b) controlling the key cutting and cleaning mechanism 116 to cut the key according to the stored bitting pattern and then clean the key to remove burrs, etc.

Figure 8:
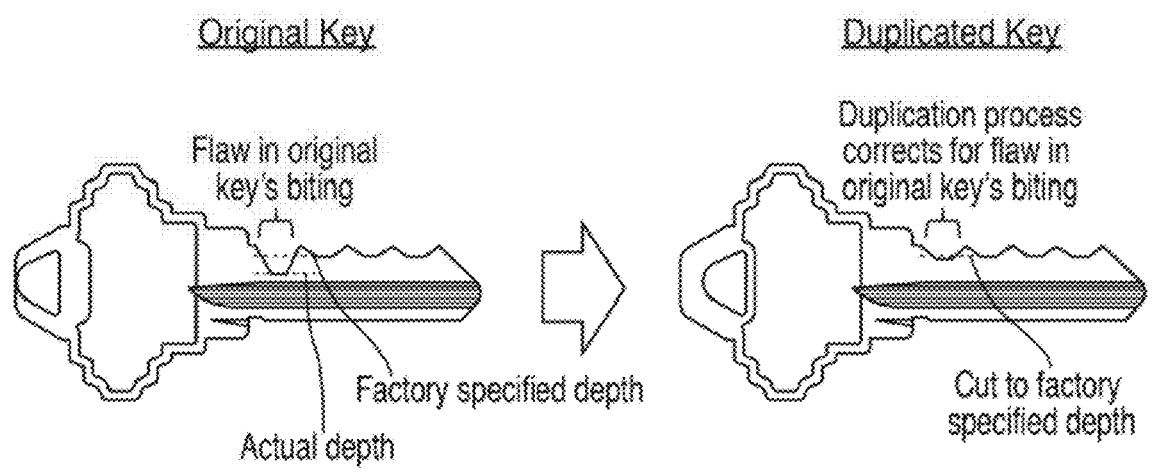
FIG. 8 shows an example illustrating the concept of returning a key bite pattern to factory specifications when making a duplicate key in accordance with some embodiments of the disclosed subject matter.

In some embodiments, the bitting pattern from the originally scanned key can be compared to a database of known bitting specifications for keys and locks. From this comparison, an inference can be made as to the factory specifications of the bitting of the to-be-copied key. When a duplicate is created, it can be cut to these factory specifications instead of merely replicating the original key's bitting profile. This allows for correction of flaws in the original key resulting from wear-and-tear, previous duplications, or other causes. An example of this is shown in FIG. 8. In doing so, a duplicated key can be more accurate than a previous copy. Additionally or alternatively, a user can identify the type of lock that the key is for by entering a make and/or model of the lock. The make and/or model of the lock can be compared to a database to determine factory specifications corresponding to the lock type and key identified by the user, and the duplicate can be replicated using the original bitting profile as described above.

In addition to correcting for imperfections in a key's bitting depths during a duplication, other imperfections in a previous key can also be corrected. For example, the bitting platform length, the platform spacing, the platform offset, localized deformations, and/or bitting angles can be corrected in some embodiments. In some embodiments keys at custom, non-factory specifications can additionally be produced.

Finally, at 330, the process can cause the key to be dispensed to a user. For example, the hardware processor can control the key cutting and cleaning mechanism 116 to drop the key in the key dispensing chute.

In some embodiments, a subset of what is shown in process 300 can be used. For example, when hardware 100 is implemented as a scan-only kiosk, only steps 316, 318, 320, and 322 can be performed by a corresponding process.

It should be understood that some of the above steps of the flow diagram of FIG. 3 can be executed or performed in an order or sequence other than the order and sequence shown and described in the figure. Also, some of the above steps of the flow diagram of FIG. 3 can be executed or performed substantially simultaneously where appropriate or in parallel to reduce latency and processing times.

Referring to FIGS. 4-7, key scanning in accordance with some embodiments is further described.

Figure 4A:
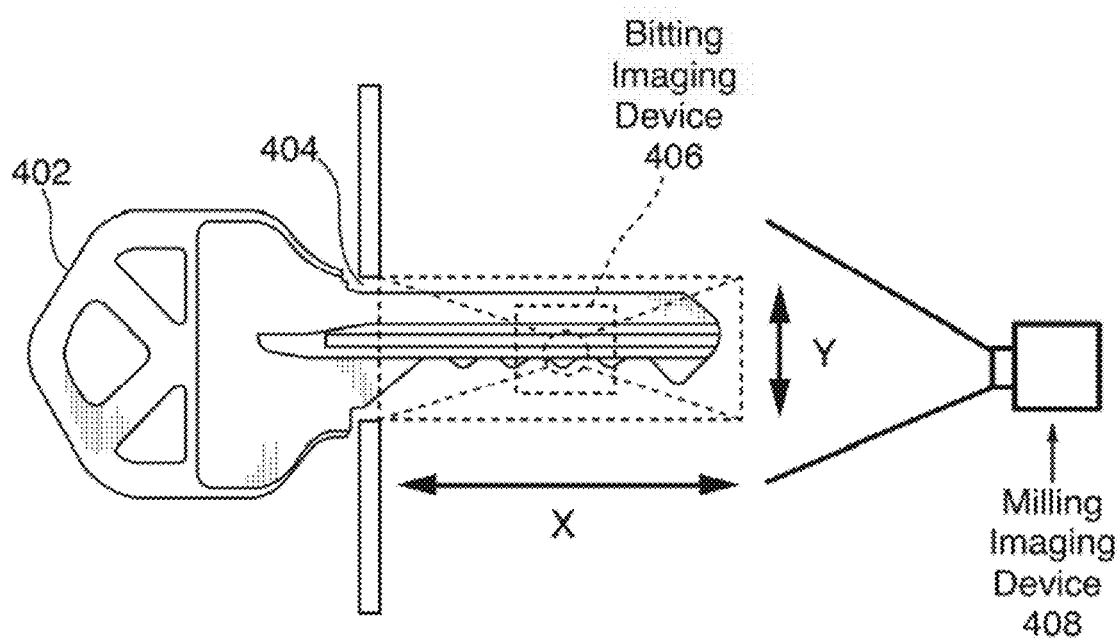
FIG. 4A shows an illustrative example of a scanning arrangement for capturing geometric information about a key in accordance with some embodiments of the disclosed subject matter.

As shown in FIG. 4A, in order to be scanned, a key 402 can be inserted by a user into a slot 404. The key scanning slot can be able to accommodate a variety of blank types with varying lengths, widths, and shapes. The key scanning slot can properly position the key to ensure the scanning process is successful. The key scanning slot can be positioned at a downward angle so that the key gravity will assist the user in ensuring that the key is inserted fully. The key scanning slot can allow a user to maintain contact with the handle of the key at all times in some embodiments. The key scanning slot can permit the key to remain attached to a keychain (or key ring, or any other key retention device) during key scanning.

Figure 4B:
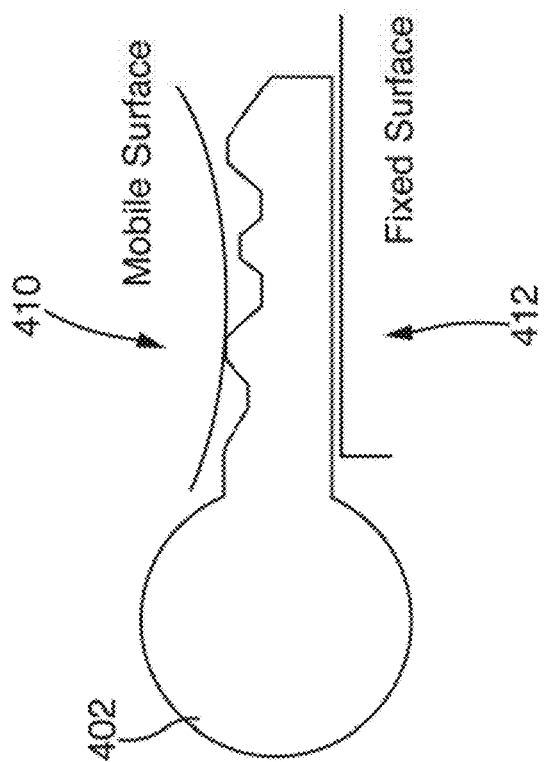
FIG. 4B shows an illustrative example of a mechanisms for holding a key in a particular position while geometric information about the key is captured in accordance with some embodiments of the disclosed subject matter.
Figure 4B:
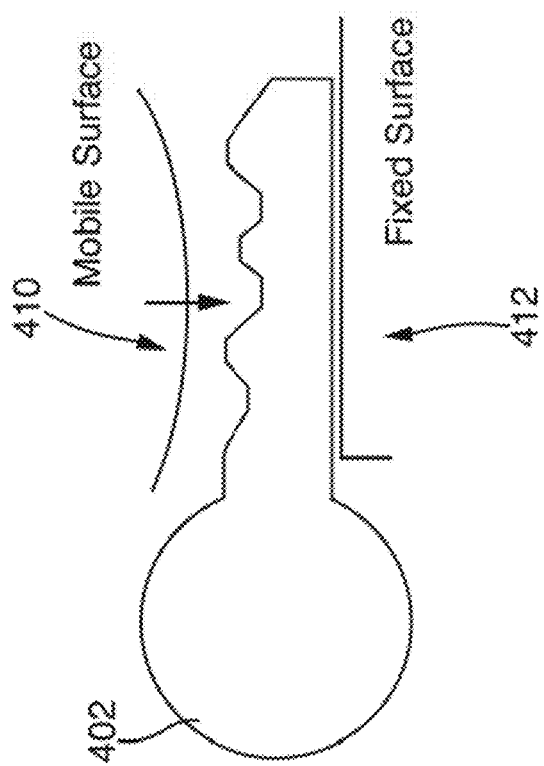

As shown in FIG. 4B, key 402 can be fixed in position between a mobile surface 410 and a fixed surface 412 while key 402 is being scanned in accordance with some embodiments. In such an embodiment, the force from mobile surface 410 applied to the teeth of key 402 can fix key 402 in place against fixed surface 412. This can allow for keys to be scanned to be aligned in the same position each time a key is inserted and ensure that there is no movement of the key when geometric information about the key is being scanned.

Figure 5:
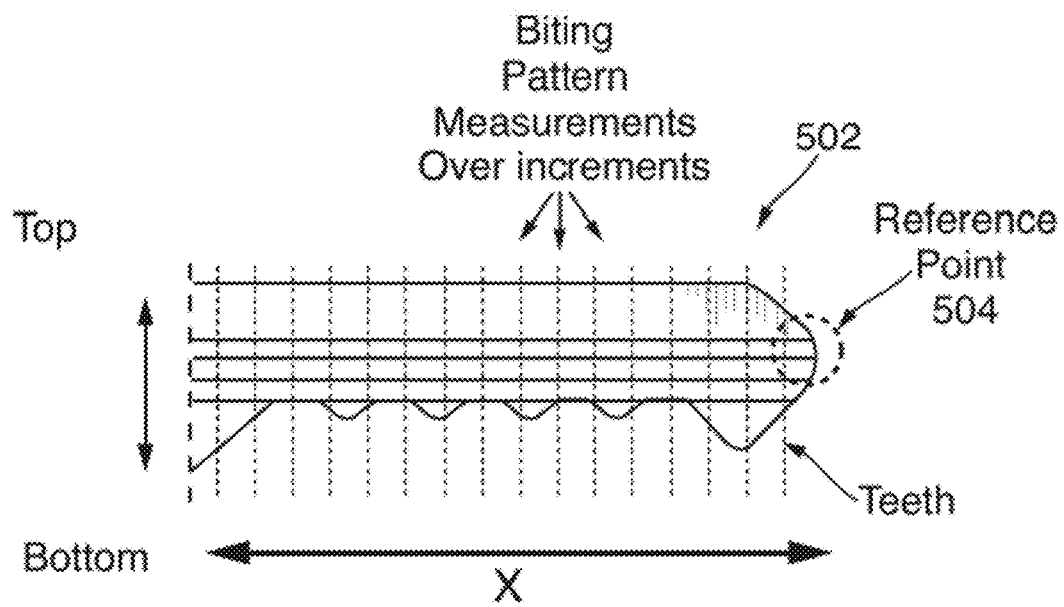
FIG. 5 shows an illustrative example of geometric information about a key captured from a side view of the key in accordance with some embodiments of the disclosed subject matter.
Figure 6:
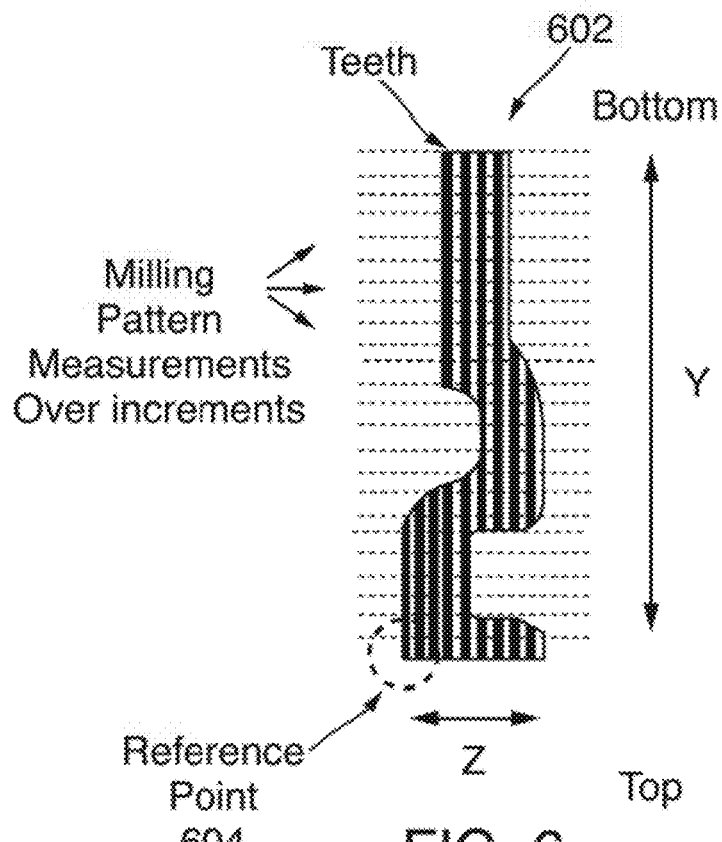
FIG. 6 shows an illustrative example of geometric information about a key captured from an end view of the key in accordance with some embodiments of the disclosed subject matter.

Once in the slot, one or more imaging devices 406 and 408 can be used to optically detect a bitting pattern and a key blank type of the key in some embodiments. For example, as shown in FIG. 5, an imaging device 406 can be used to capture an image 502 of key 402. As another example, as shown in FIG. 6, an imaging device 408 can be used to capture an image 602 of key 402. Using these two images, parameters unique to each key can be detected in order to correctly determine both the bitting pattern and key blank type of the key.

In order to do so, in some embodiments, a thresholding algorithm, such as Otsu's Method (described, for example, in N. Otsu, "A thresholding selection method from gray level histogram", IEEE Trans. on Systems, Man and Cybernetics, 9 (1), 62-66, January 1979, which is hereby incorporated by reference herein in its entirety), can first be used to pre-process the images and remove any spectral noise data. Then, once pre-processing of both images has been accomplished, a corner detection algorithm, such as Harris' Method (described, for example, in C. Harris and M. J. Stephens. "A combined corner and edge detector", Alvey Vision Conference, pages 147-152, 1988, which is hereby incorporated by reference herein in its entirety), can be used to detect reference points 504 and 604 in images 502 and 602, respectively.

As shown in FIG. 6, point 604 can be the left-most, lower corner of the key. From this point, width variations in the z-axis of the key can be measured over regular increments along the y-axis. These width variations can be compared to known key blank data to determine a key blank type (or milling type). This data can be used to select the appropriate blank type during the key replication.

As shown in FIG. 5, point 504 can be the tip of the key end. From this point, height variations in the y-axis of the key can be measured over regular increments along the x-axis. These height variations can be used to determine the bitting pattern of the key and to cut the key during the key replication.

Machine learning algorithms can also be employed to improve the accuracy and capabilities of the machine vision software.

In some embodiments, a laser-based mechanism, for detecting a milling type and a bitting pattern of a key can be used. Such a laser-based mechanism can be used to scan a key and detect the outline of the key from each of the perspectives illustrated in FIGS. 5 and 6.

Figure 7:
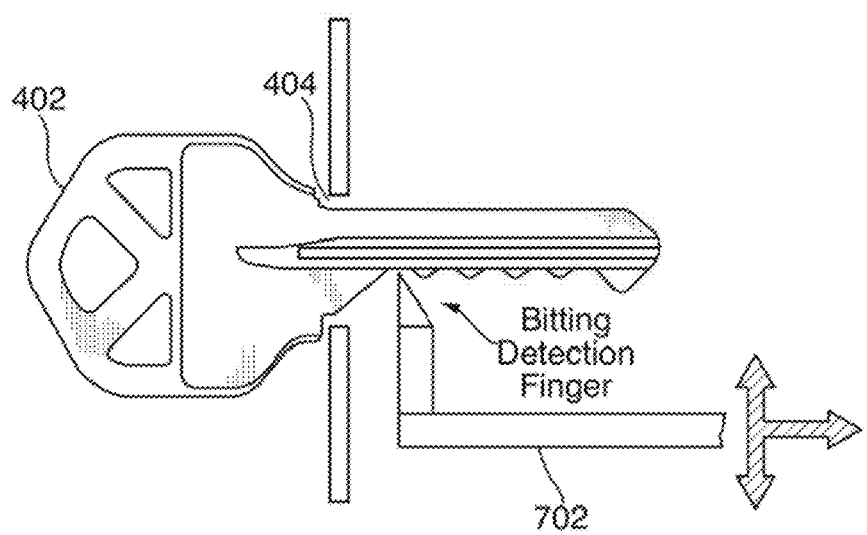
FIG. 7 shows an illustrative example of a physical scanning arrangement for capturing geometric information about a key in accordance with some embodiments of the disclosed subject matter.

As described above, additionally or alternatively to detecting the bitting pattern and the blank type optically, a mechanical mechanism can be used to detect one or more of these features of a key. For example, as shown in FIG. 7, a bitting detection finger 702 can be used to detect the bitting of a key. More particularly, for instance, the movement of the finger can be detected by suitable electromechanical sensors as key 402 is entered into slot 404. As another more particular example, the finger can be moved automatically along the key after the key has been inserted into the slot and the bitting pattern detected based on up and down movements of the finger as detected by a suitable electromechanical sensor.

In some embodiments, rather than detecting key blank type (or milling type) as described above, a dedicated key slot for each key type available can be used. In such a case, upon entering a key into a key slot, the key blank type can be determined simply from the fact that the key fits into the slot.

In some embodiments, a tray can be provided where a user can place a key to be scanned. Such a tray can be provided in lieu of or in addition to slot 404. Such a tray can allow for irregularly shaped keys (e.g., tubular keys, four sided keys, Zeiss keys, skeleton keys, etc.) that may not fit into slot 404 to be scanned by the kiosk using any suitable technique, such as the techniques described herein.

In some embodiments, a key to be replicated can be held in front of a particular location on a kiosk where the key can be scanned. This can allow for irregularly shaped keys (e.g., tubular keys, four sided keys, Zeiss keys, skeleton keys, etc.) that may not fit into slot 404 to be scanned by the kiosk using any suitable technique, such as the techniques described herein.

In some embodiments, any other suitable mechanisms for detecting bitting patterns and/or key blank type can be used in some embodiments. For example, in some embodiments, key bitting can be detected by: many small mechanical pins which are pushed by key bitting and the pin positions get detected by suitable electromechanical sensors; one or more LED and/or photodiode arrays which detect obstruction created by the key bitting; micro air flow detectors which detect obstructions caused by bitting; heat sensors which detect obstructions caused by bitting; ultrasonic distance sensors; etc.

In some embodiments, in addition to a key being scanned using one or more key detector(s) 106 as described above, a key can be scanned using any other suitable device(s). For example, in some embodiments, a key can be scanned using any optical detector, scanner, camera, mobile phone, smartphone, tablet computer, etc. In such embodiments, for example, a user can be able to photograph a key and supply one or more corresponding images to hardware processor 110 (or any other suitable hardware processor) so that the hardware processor can process the image(s) to detect the key's bitting pattern and/or key blank type. In some embodiments, the image(s) can contain reference objects, such as a quarter, in order to determine the size of the key.

In some embodiments, users can scan a key on their smartphone or tablet computer. Furthermore, in some embodiments, an application can be downloaded to assist users in capturing quality images of their key. From a mobile application or website platform, users can also request a duplicate of their scanned key be sent via mail to an address of their choosing, in some embodiments.

In some embodiments, a user can also authorize others to access their key information using the mobile application or website platform. Authorized recipients can use the digital key information to request a physical copy via mail order, create a physical copy at a kiosk, or make a physical copy with any suitable key duplication hardware. For example, in some embodiments, when a user is locked out, that person can retrieve his/her key type and bitting code information from the mobile application or website platform, enabling any operator of a suitable key duplication machine to create a copy without the physical presence of the original.

In some embodiments, a user can retrieve his/her key type and bitting code information from the mobile application or website platform, and order a duplicate key to be delivered to the user based on location information provided to the mobile application or website platform. For example, the location information can be provided using a mobile phone equipped with a Global Positioning System (GPS) receiver. As another example, a user can specify coordinates where the duplicate key is to be delivered. As yet another example, a user can specify an address where the duplicate key is to be delivered. The order for the duplicate key ordered by the user can be received by a key duplicating service. The key duplicating service can then use the key type and bitting information to create a duplicate key and can deliver the duplicate key to the user at the specified location. Additionally, the user can use the application or website platform to pay for the duplication and delivery of the duplicate key to their location.

In accordance with various embodiments, mechanisms (which can include systems and methods) for duplicating transponder keys and managing key information thereof are provided.

In some embodiments, the mechanisms for duplicating transponder keys and managing key information thereof can determine that information for a transponder key (such as a key for an automobile) is to be scanned. For example, a user can indicate, through an input device of a kiosk, that the user wishes to scan a transponder key. In some embodiments, the mechanisms described herein for duplicating transponder keys and managing key information thereof can receive information related to the transponder key, which can be used to determine likely properties of a signal that is emitted by the transponder key and/or a signal to be used to initiate the emission of such a signal from the transponder key. For example, the mechanisms for duplicating transponder keys and managing key information thereof can receive the make, model and year of an automobile corresponding to the transponder key (e.g., an automobile that can be used by possessing and using the transponder key). In some embodiments, the mechanisms described herein for duplicating transponder keys and managing key information thereof can detect a signal emitted by the transponder key (which may or may not be a response to a signal emitted by the mechanisms described herein). This signal can be used by the mechanisms described herein for duplicating transponder keys and managing key information thereof to determine a transponder chip and/or programming for a transponder chip to be used in creating a duplicate key. For example, in the case of an automobile key using a passive transponder chip, the mechanisms described herein for duplicating transponder keys and managing key information thereof can cause a signal to be emitted that, in turn, causes the passive transponder chip of the automobile key to emit a responsive signal that is required by the automobile in order to allow the automobile to be started and/or turned on. This responsive signal can be used to identify the properties and/or programming of a transponder chip to be used to create a duplicate of the automobile key. In some embodiments, the mechanisms described herein can receive an instruction from a user to create a duplicate and deliver that duplicate to the user at a location specified by the user.

Figure 13:
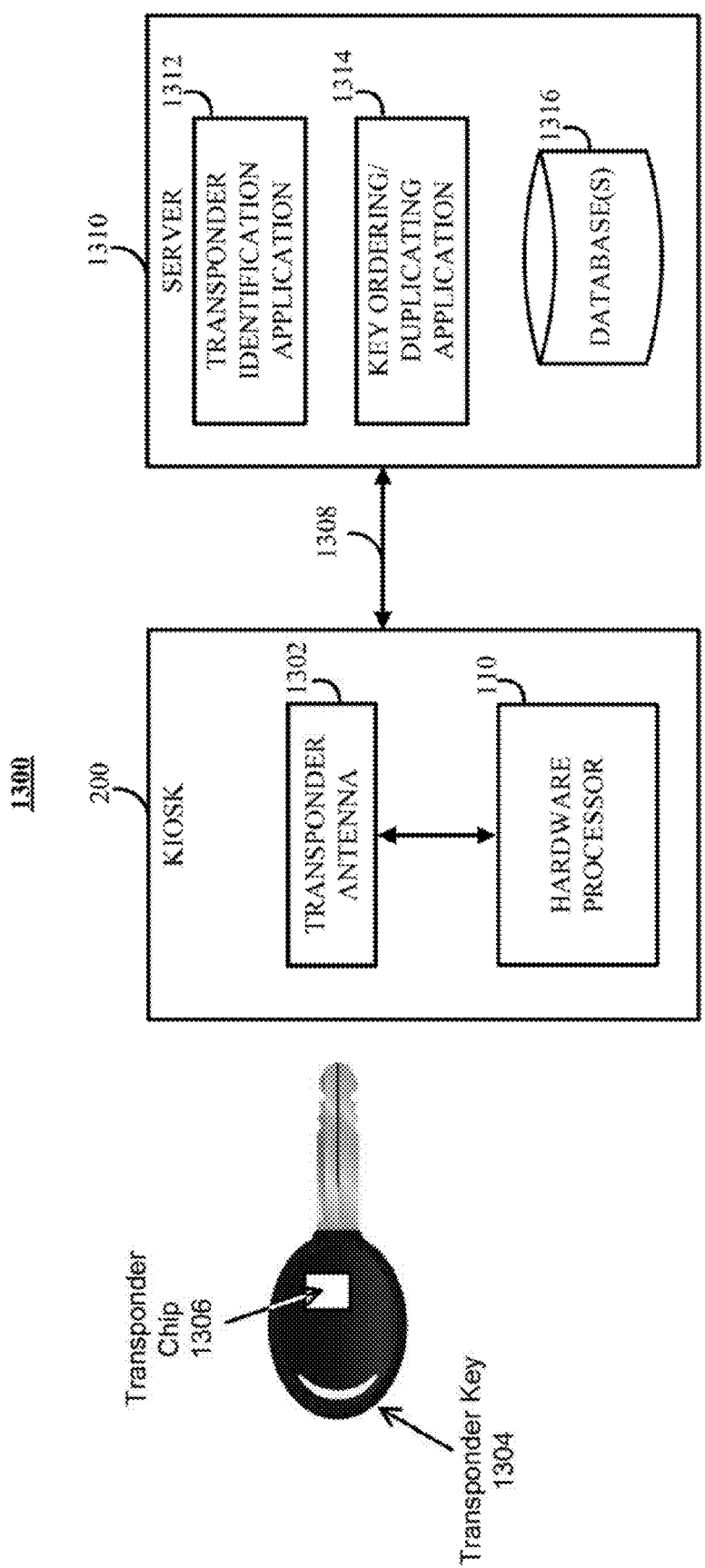
FIG. 13 shows an illustrative example of a system for duplicating transponder keys and managing the key information thereof in accordance with some embodiments of the disclosed subject matter.

FIG. 13 shows an example 1300 of a system for duplicating transponder keys and managing the key information thereof in accordance with some embodiments of the disclosed subject matter. As shown in FIG. 13, in some embodiments, kiosk 200 can include a transponder antenna 1302 that can be coupled to hardware processor 110. In such embodiments, transponder antenna 1302 can be used to send and/or receive signals from a transponder chip 1304 included in a transponder key 1306. For example, as described below in connection with 1802 of FIG. 18, in response to hardware processor 110 determining that key information for a transponder key is to be determined, hardware processor 110 can cause a signal to be emitted using transponder antenna 1302 and/or can cause a signal received by transponder antenna 1302 to be recorded. In some embodiments, transponder antenna 1302 can be coupled to any suitable hardware for generating signals to be emitted by transponder antenna 1302 and/or any suitable hardware for outputting signals received by transponder antenna 1302 to, for example, hardware processor 110.

In some embodiments, transponder antenna 1302 can be any suitable antenna or antennas for sending and/or receiving signals to and/or from a transponder chip (e.g., transponder chip 1306). For example, transponder antenna 1302 can include a loop antenna that operates in the range of 100-150 kilohertz (kHz). In a more particular example, for certain types of transponder keys (such as automobile transponder keys associated with certain manufacturers) transponder antenna 1302 can emit and receive signals at 125 kHz, and for other types of transponder keys (such as automobile transponder keys associated with other manufacturers) transponder antenna 1302 can emit and receive signals at 134.2 kHz. In some embodiments, transponder antenna 1302 can include one or more antennas suitable for emitting and/or receiving signals at frequencies at which transponder keys to be duplicated operate.

In some embodiments, transponder key 1304 can be any suitable key for accessing or using any suitable property and/or for operating any suitable locking mechanism or mechanisms. For example, transponder key 1304 can be a key for an automobile, such as a car. In some embodiments, transponder key 1304 can include bitting information on a key shaft (e.g., can include a geometric information). As another example, bitting information can be omitted from transponder key 1304 such that a signal from a transponder (e.g., transponder chip 1306) of transponder key 1304 is sufficient to operate a lock/ignition to which transponder key 1304 corresponds.

Transponder chip 1306 can be any suitable transponder hardware, firmware and/or software for causing a signal to be transmitted to a transponder antenna associated with a lock and/or an ignition (or any other suitable transponder antenna). Although the signal emitted by the transponder key is described as being emitted by a transponder chip, this is merely used for convenience of explanation and is not intended to limit the hardware, firmware and/or software used to emit such as signal to only those devices that can be described as chips. In some embodiments, transponder chip 1306 can be a passive device that does not require connection to a power source, such as a battery. For example, transponder chip 1306 can be an inductively coupled transponder, which can emit a signal in response to a received signal having proper characteristics (e.g., a proper frequency, amplitude, etc.). In some embodiments, such passive transponder chips can have a limited range (e.g., a range at which a signal transmitted by the transponder can be received at an adequate power) on the order of two to fifteen centimeters due to the lack of a power source other than the received signal. Alternatively, transponder chip 1306 can be an active device that uses a connected power source, such as a battery, when generating a signal. Such an active transponder key and/or transponder chip can, in some embodiments, transmit a signal that can be received at a longer range than a passive transponder chip. In some embodiments, transponder chip 1306 can store a code that is included in the signal emitted by transponder chip 1306. Such a code, emitted by the transponder chip, can be encrypted in storage and/or can be encrypted prior to emission by the transponder chip. In some embodiments, transponder chip 1306 can be coupled to an antenna disposed within transponder key 1304 for receiving power and/or signals from an external source and/or for emitting a signal. Such a code can be stored by transponder chip using any suitable technique or combination of techniques.

As described below in connection with FIG. 18, in some embodiments, kiosk 200 can receive user input indicating that a key is to be duplicated and/or that key information (e.g., a key template) is to be saved. In some embodiments, kiosk 200 can scan a key to be duplicated using key detector 106, described above in connection with FIG. 1, and/or transponder antenna 1302. In some embodiments, kiosk 200 can use information in a received signal from transponder chip 1306 to create a new key, store information about the transponder chip, determine a manufacturer of transponder key 1302, and/or perform any other suitable actions.

In some embodiments, kiosk 200 can cause information received by transponder antenna 1302 to be transmitted to a server 1310 over a communication link 1308 and/or a communication network, as described below in connection with FIGS. 16 and 17. In some embodiments, server 1310 can receive at least a portion of the information that was received from transponder chip 1306 by transponder antenna 1302. This information can be used by server 1310 to, for example, identify a transponder chip to be used in a duplicate of transponder key 1304 and/or programming instructions for programming a transponder chip for a duplicate of transponder key 1304. For example, server 1310 can execute a transponder identification application 1312 which can use the transponder signal information received from kiosk 200, along with any other suitable information (e.g., a manufacturer, a model number, a year, etc., of a vehicle with which transponder key 1304 is used) to identify a proper transponder chip and/or programming for creating a duplicate of transponder key 1304. In some embodiments, information regarding a proper transponder chip and/or programming can be stored in a database 1316 with any other suitable information (e.g., geometric information of transponder key 1304) for creating a duplicate of transponder key 1304. In some embodiments, database 1316 can also store information for creating non-transponder keys (e.g., as described above in connection with FIGS. 1-12).

Additionally or alternatively, database 1316 can store information that can be used in identifying a proper transponder chip and/or proper programming for creating a duplicate of transponder key 1304. In some embodiments, a database for storing key information can be different than a database for storing information for identifying a transponder chip and/or proper programming to be used for creating a duplicate of a transponder key.

In some embodiments, server 1310 can execute a key ordering/duplicating application 1314 which can use the key information received from kiosk 200 and/or retrieved from database 1316 to create and/or order a duplicate of a particular transponder key (e.g., transponder key 1304). Key ordering/duplicating application 1314 can cause one or more devices to perform any suitable actions. For example, key ordering/duplicating application 1314 can cause a key blank to be selected and/or retrieved based on the key information about the key to be duplicated. As another example, key ordering/duplicating application 1314 can cause a key blank to be cut based on geometric information included in the key information. As yet another example, key ordering/duplicating application 1314 can cause a transponder chip to be selected and/or programmed based on the information determined, for example, by transponder identification application 1312. As still another example, key ordering/duplicating application 1314 can cause information required to create a duplicate of a transponder key to be transmitted to a remote location for creation of the duplicate transponder key.

Figure 14:
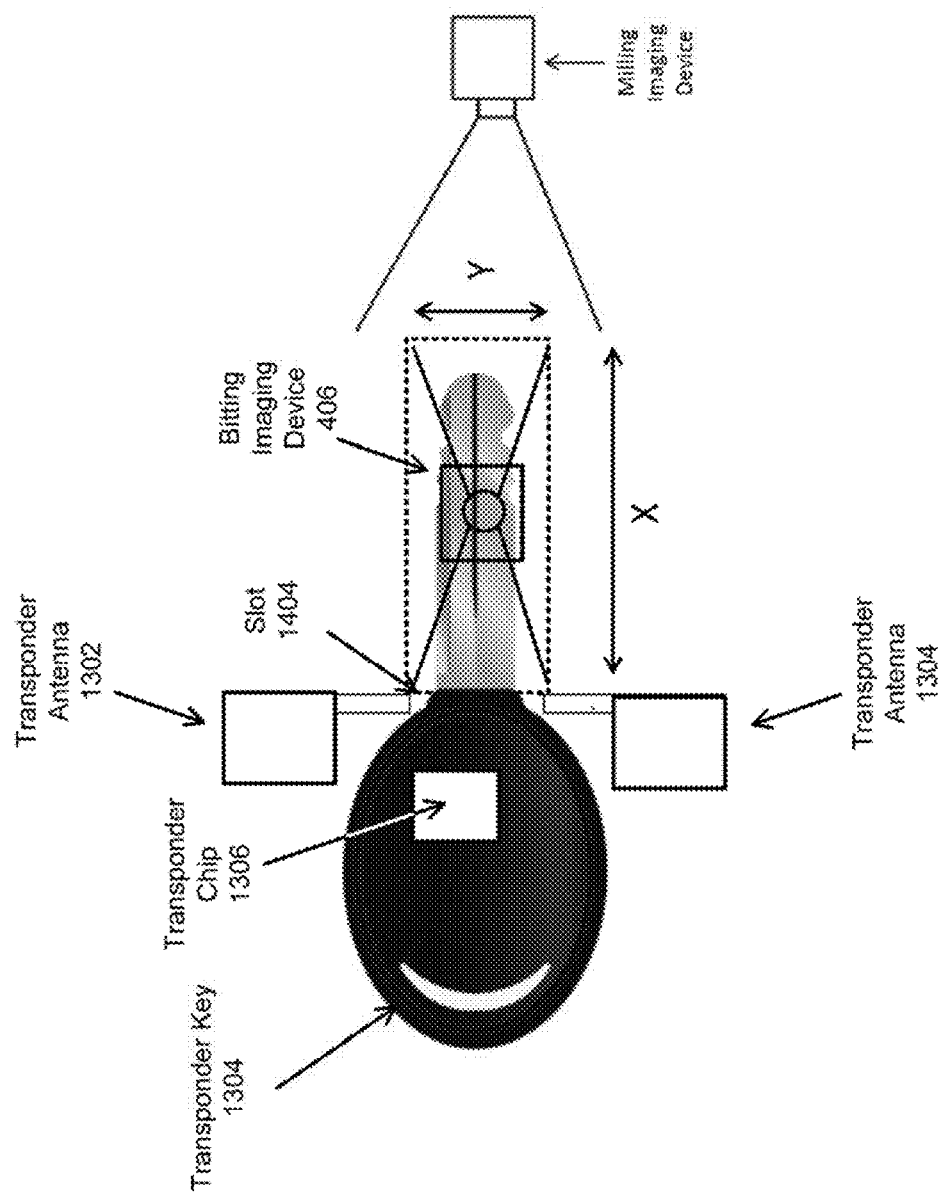
FIG. 14 shows an illustrative example of a portion of the system of FIG. 13 that can be used in accordance with some embodiments of the disclosed subject matter.

FIG. 14 shows an example of a portion of system 1300 in accordance with some embodiments of the disclosed subject matter. As shown in FIG. 14, a key to be scanned (e.g., transponder key 1304) can be inserted into a slot 1404 (e.g., similar to slot 404 as described above in connection with FIG. 4A). In some embodiments, for example as shown in FIG. 14, slot 1404 can be arranged such that a surface in which slot 1404 is disposed is recessed from a position of transponder antenna 1302. Such an arrangement can bring a transponder chip (e.g., transponder chip 1306) of a transponder key for which information is to be determined into a sufficiently close proximity to transponder antenna 1302 to sense signals from the transponder chip. Additionally, in some embodiments, such an arrangement can facilitate sensing information from the transponder chip in parallel with sensing of geometric properties of the key (e.g., using detector(s) 106), potentially reducing the total time required to scan a transponder key. Note that, in cases in which the transponder key does not include a blade and/or a bitting pattern, and/or where such information is unnecessary for accessing the property for which the transponder key In some embodiments, transponder antenna 1302 can be arranged at any suitable location, and can have any suitable size and/or shape. For example, in some embodiments, transponder antenna 1302 can be arranged as a raised or flush reader to which a user is directed to hold up a transponder key. In such an example, transponder antenna 1302 can be arranged in a different portion than slot 1404 (and/or slot 404).

Figure 15:
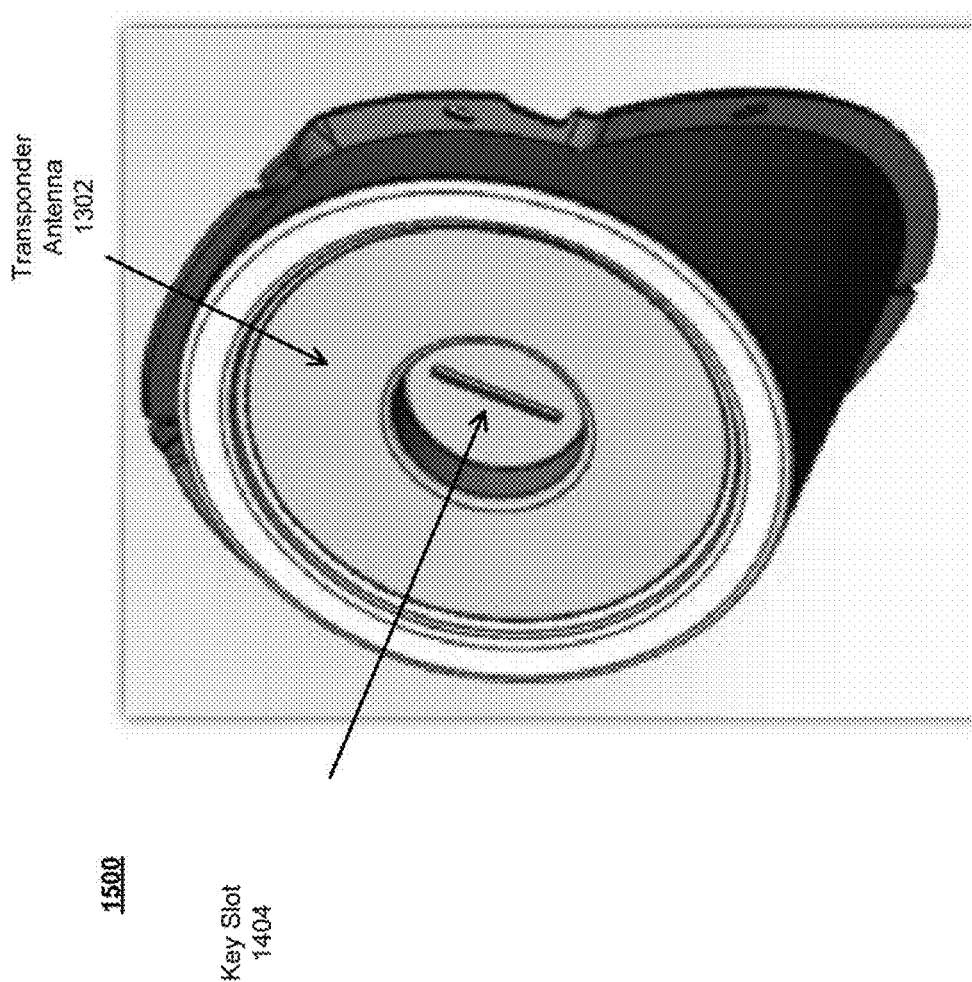
FIG. 15 shows an illustrative example of a housing that receives a key and encloses a transponder antenna in accordance with some embodiments of the disclosed subject matter.

FIG. 15 shows an example 1500 of a housing that receives a key (e.g., key 402, transponder key 1304, etc.) and encloses a transponder antenna in accordance with some embodiments of the disclosed subject matter. As shown in FIG. 15, key slot 1404 can be recessed from an outer surface of housing 1500, such that a portion of housing 1500 that encloses transponder antenna 1302 can be disposed more closely to a key head of a transponder key (e.g., transponder key 1304) a blade of which is inserted into key slot 1404.

Figure 16:
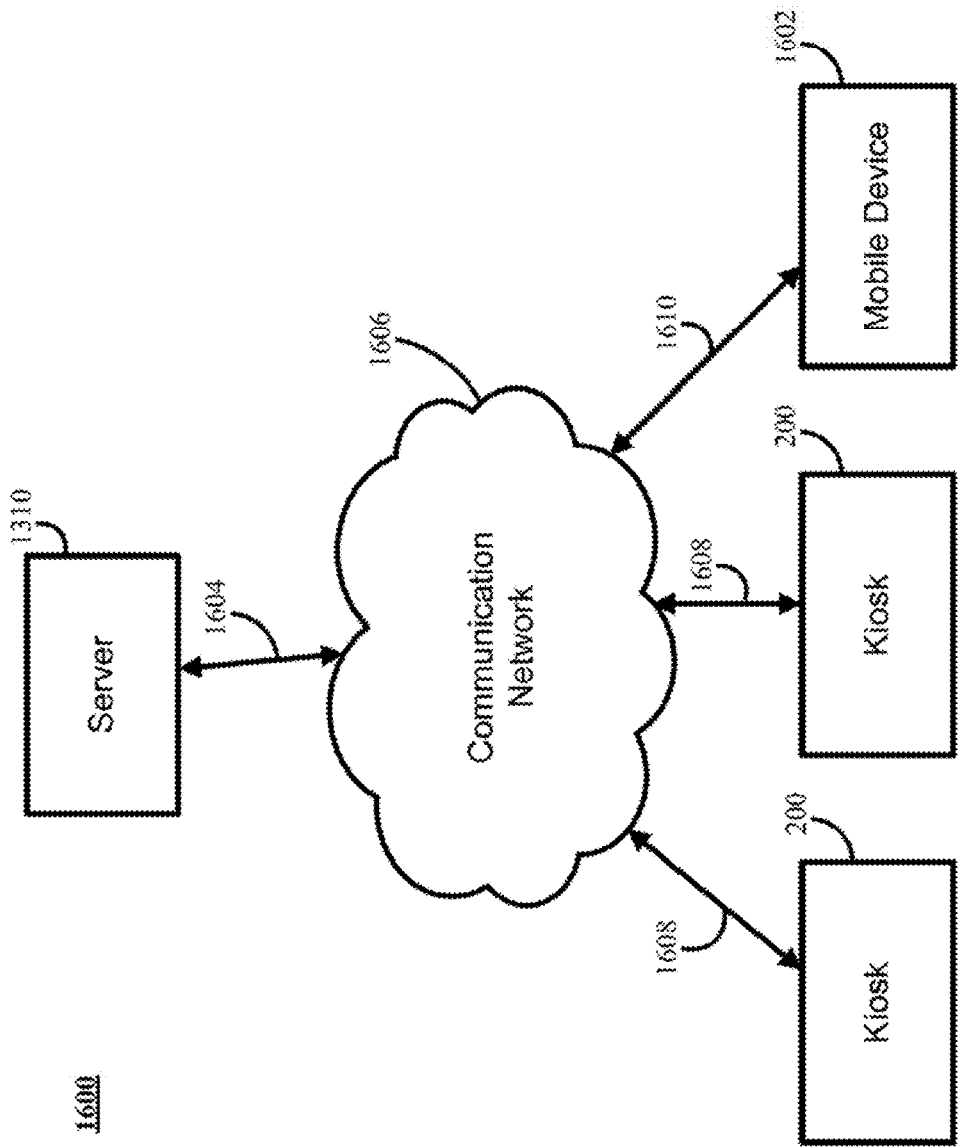
FIG. 16 shows an illustrative example of a generalized schematic diagram of a system on which the mechanisms for duplicating transponder keys and managing the key information thereof can be implemented in accordance with some embodiments of the disclosed subject matter.

FIG. 16 shows an illustrative example 1600 of a generalized schematic diagram of a system on which the mechanisms for duplicating transponder keys and managing the key information thereof can be implemented in accordance with some embodiments of the disclosed subject matter. As shown, system 1600 can include one or more kiosks 200. Kiosks 200 can be local to each other or remote from each other. Kiosks 200 can be connected by one or more communications links 1608 to a communication network 1606 that can be linked to server 1310 via a communications link 1604 and/or mobile device 1602 via communications link 1610. In some embodiments, communications link 1308, described above in connection with FIG. 13, can include one or more of communications link 1608, communications link 1604 and/or communication network 1606.

System 1600 can include one or more servers 1310. Server 1310, as described above in connection with FIG. 13, can be any suitable server or servers for providing access to the mechanisms described herein for duplicating keys (e.g., as described above in connection with FIGS. 1-12) and/or duplicating transponder keys (e.g., as described above in connection with FIGS. 13-15 and described below in connection with FIG. 18) and managing the key information thereof, such as a processor, a computer, a data processing device, or any suitable combination of such devices. For example, the mechanisms for duplicating keys and/or duplicating transponder keys and managing the key information thereof can be distributed into multiple backend components and multiple frontend components and/or user interfaces. In a more particular example, backend components, such as mechanisms for storing information to be used to create duplicate keys, for determining a transponder chip and/or transponder chip programming to be used in creating a duplicate key, creating a duplicate transponder key based on the information to be used to create a duplicate transponder key, causing the duplicate transponder key to be delivered to a location specified by a user, etc., can be performed on one or more servers 1310. In another particular example, frontend components, such as presentation of a user interface for assisting a consumer in scanning a transponder key, requesting a duplicate transponder key, causing information to be used in creating a new transponder key to be stored, etc., can be performed on one or more kiosks 200 and/or mobile devices 1602.

In some embodiments, each of kiosks 200, server 1310, and mobile devices 1602 can include any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, kiosk 200 can implemented as a device including any suitable components, such as those described above in connection with FIGS. 1-15. As another example, mobile device 1602 can be implemented as a smartphone, a tablet computer, a mobile telephone, a wearable computer, a laptop computer, a portable game console, a digital camera, any other suitable mobile computing device, or any suitable combination thereof. As another example, mobile device 1602 can be a non-mobile computing device such as a personal computer, a server, a point of sale system or electronic point of sale system (e.g., a cash register at a hardware store), a digital media receiver, a set-top box, a smart television, a home entertainment system, any other suitable non-mobile computing device, or any suitable combination thereof. In some embodiments, server 1310 can be implemented using any suitable computing device or combination of devices, such as a server, a personal computer, a point of sale system or electronic point of sale system, a digital media receiver, a set-top box, a smart television, a home entertainment system, a smartphone, a tablet computer, a mobile telephone, a wearable computer, a laptop computer, a portable game console, a digital camera, any other suitable mobile computing device, or any suitable combination thereof.

Communications network 1606 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 1604, 1608 and 1610 can be any communications links suitable for communicating data among kiosks 200, server 1310 and/or mobile devices 1602, such as network links, dial-up links, wireless links, hardwired links, any other suitable communications links, or any suitable combination of such links. Note that, in some embodiments, multiple servers 1310 can be used to provide access to different mechanisms associated with the mechanisms described herein for duplicating keys and/or duplicating transponder keys and managing the key information thereof. For example, system 1600 can include: a transponder key information server 1310 that facilitates identification of a proper transponder chip and/or transponder chip programming for a particular transponder key using the mechanisms described herein; a key ordering server 1310 that causes a key and/or transponder key to be ordered based on received and/or stored information about such a key and/or transponder key; a management server 1310 that coordinates operations of various kiosks 200 and/or other servers; and/or any other suitable servers for performing any suitable functions of the mechanisms described herein.

Figure 17:
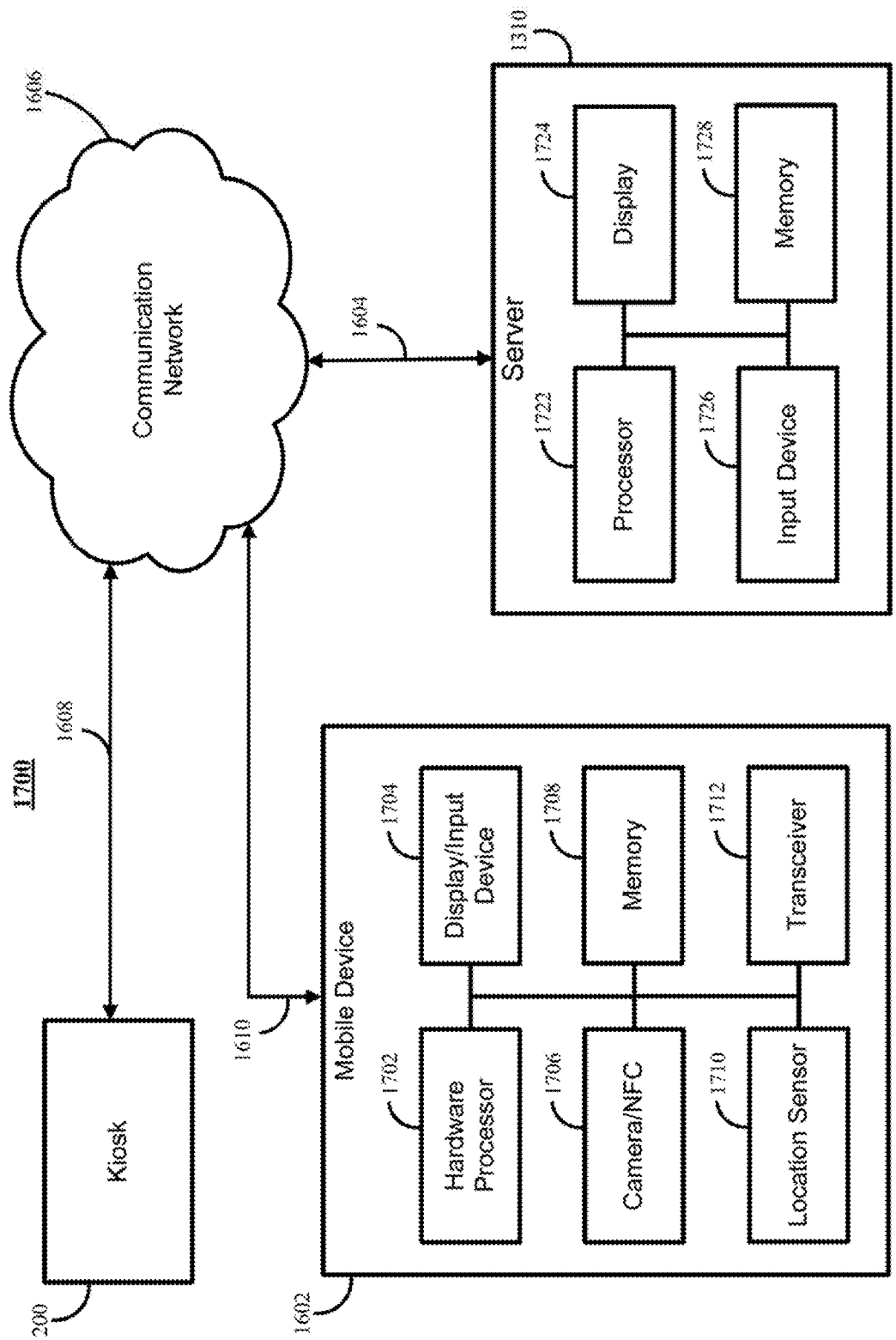
FIG. 17 shows an illustrative example of hardware that can be used to implement one or more of kiosk, servers and mobile devices depicted in FIGS. 1, 13 and/or 16 in accordance with some embodiments of the disclosed subject matter.

FIG. 17 shows an illustrative example 1700 of hardware that can be used to implement one or more of kiosk 200, servers 1310 and mobile devices 1602, depicted in FIGS. 1, 13 and/or 16 in accordance with some embodiments of the disclosed subject matter. Referring to FIG. 17, mobile device 1602 can include a hardware processor 1702, a display/input device 1704, a camera 1706, memory 1708, one or more location sensors 1710, and one or more transceivers 1712, which can be interconnected. In some embodiments, memory 1708 can include a storage device (such as a non-transitory computer-readable medium) for storing a computer program for controlling hardware processor 1702.

Hardware processor 1702 can use the computer program to execute the mechanisms described herein for duplicating keys and/or duplicating transponder keys and managing the key information thereof (e.g., as described above in connection with FIGS. 3, 13, 14, and/or below in connection with FIG. 18), presenting a user interface, capturing images of a key, to perform any other suitable functions, and/or to send and receive data through communications link 1610 (e.g., using transceiver 1712). In some embodiments, hardware processor 1702 can send and receive data through communications link 1610 or any other communication links using, for example, a transmitter, a receiver, a transmitter/receiver, a transceiver (such as transceiver 1712), and/or any other suitable communication device. Display/input device 1704 can include a touchscreen, a flat panel display, a cathode ray tube display, a projector, a speaker or speakers, any other suitable display and/or presentation devices, a computer keyboard, a computer mouse, a touchpad, a microphone, a voice recognition circuit, a touchscreen input, and/or any other suitable input device. Camera 1706 can include any suitable image sensor, a lens, control circuitry, and/or image processing circuitry to capture image data in response to instructions from hardware processor 1702 (or any other suitable instructions such as a shutter button). Location sensor 1710 can include any suitable location sensor such as an antenna for receiving global positioning system (GPS) signals and determining a location of mobile device 1710 using such signals. Although location determination using GPS is generally described herein, location sensor 1710 can use any other suitable technique or techniques for determining a location of mobile device 1602 such as by using signal strength to cellular telephone base stations, by determining the location of a wireless network to which mobile phone is connected (e.g., an address associated with a local area network). Transceiver 1712 can include any suitable circuitry and/or antennas for communicating over communications link 1610 and/or communication network 1606, such as a cellular transceiver for communication voice and/or data information (using any suitable cellular voice and/or data protocols such as GSM, TDMA, LTE, and/or any suitable protocols).

Server 1310 can include a hardware processor 1722, a display 1724, an input device 1726, and memory 1728, which can be interconnected. In some embodiments, memory 1728 can include a storage device for storing data received through communications link 1604 or through other links. The storage device can further include a server program for controlling hardware processor 1722. In some embodiments, memory 1728 can include information stored as a result of user activity (e.g., requests to store key information, requests to store user information, a request to create a duplicate key, etc.), and hardware processor 1722 can receive requests to store key information from kiosk 200 and/or mobile devices 1602 and cause such key information to be stored and/or cause a duplicate key to be created (e.g., as described above in connection with FIGS. 3, 13 and 14 and below in connection with FIG. 18). In some embodiments, the server program can cause hardware processor 1722 to, for example, execute and/or support any suitable portion of processes 300 and/or 1800 as described above in connection with FIG. 3 and below in connection with FIG. 18, respectively.

Hardware processor 1722 can use the server program to communicate with kiosks 200 and/or mobile devices 1602 as well as provide access to and/or copies of the mechanisms described herein for duplicating keys (e.g., as described above in connection with FIGS. 1-12) and/or duplicating transponder keys (e.g., as described above in connection with FIGS. 13-15 and described below in connection with FIG. 18) and managing the key information thereof. It should also be noted that data received through communications link 1604 or any other communications links can be received from any suitable source. In some embodiments, hardware processor 1722 can send and receive data through communications link 1604 or any other communication links using, for example, a transmitter, a receiver, a transmitter/receiver, a transceiver, or any other suitable communication device. In some embodiments, hardware processor 1722 can receive commands and/or values transmitted by one or more kiosks 200, mobile devices 1602 and/or one or more users of server 1310, such as a user that makes changes to adjust settings associated with the mechanisms described herein for assisting a consumer in identifying an unknown commodity product. Display 1724 can include a touchscreen, a flat panel display, a cathode ray tube display, a projector, a speaker or speakers, and/or any other suitable display and/or presentation devices. Input device 1726 can be a computer keyboard, a computer mouse, a touchpad, a voice recognition circuit, a touchscreen, and/or any other suitable input device.

In some embodiments, server 1310 can be implemented in one server or can be distributed as any suitable number of servers. For example, multiple servers 1310 can be implemented in various locations to increase reliability and/or increase the speed at which the server can communicate with kiosks 200 and/or mobile devices 1602. Additionally or alternatively, as described above in connection with FIG. 16, multiple servers 1310 can be implemented to perform different tasks associated with the mechanisms described herein.

Figure 18:
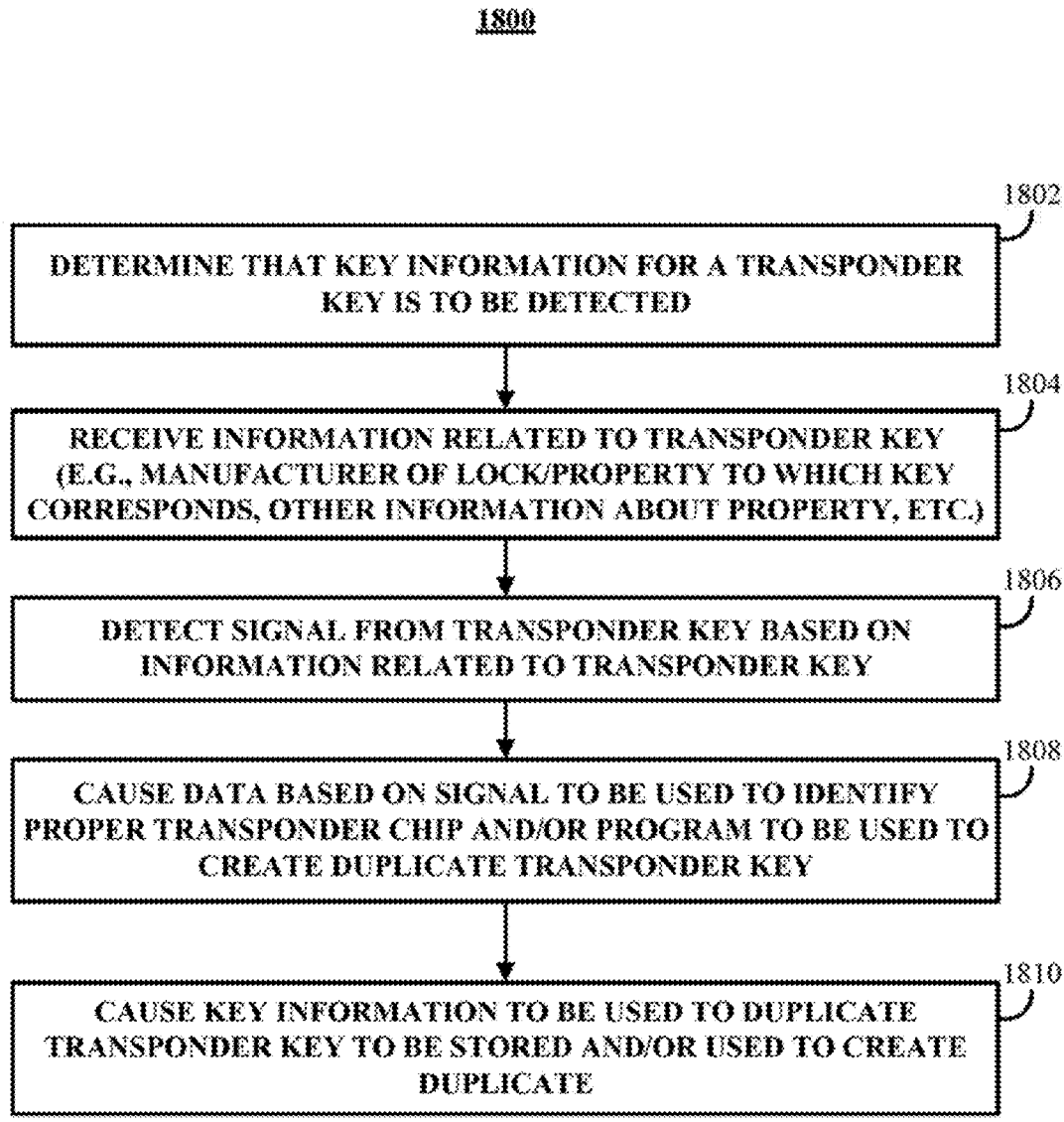
FIG. 18 shows an illustrative example of a process for duplicating a transponder key in accordance with some embodiments of the disclosed subject matter.

FIG. 18 shows an example 1800 of a process for duplicating a transponder key in accordance with some embodiments of the disclosed subject matter. As shown in FIG. 18, process 1800 can start at 1802 by determining that key information for a transponder key is to be detected. Process 1800 can use any suitable technique or combination of techniques to determine that key information for a transponder key is to be detected. For example, in some embodiments, process 1800 can determine that key information for a transponder key is to be detected based on user input to kiosk 200. In such embodiments, a user can specify that a key to be scanned is a transponder key (e.g., by specifying that the user wishes to scan a car key, a house key having a transponder, etc.). As another example, process 1800 can use transponder antenna 1302 and/or any other suitable device or combination of devices to automatically detect the presence of a transponder key (e.g., a transponder key inserted in slot 1404, a transponder key held near transponder antenna 1302, etc.) using any suitable technique or combination of techniques.

At 1804, process 1800 can receive information related to the transponder key for which key information is to be detected. Process 1800 can use any suitable technique or combination of techniques to receive information related to the transponder key. For example, process 1800 can prompt a user to provide information (e.g., using input device 104) related to the transponder key, such as what the key is for (e.g., an automobile), manufacturer information (e.g., the manufacturer of a lock for which the key is used and/or a manufacturer of property for which the key is used), and/or any other suitable information related to the transponder key. In a more particular example, in the case of an automobile transponder key, the user can be prompted to provide information about the make (i.e., manufacturer/brand), model, and year of the automobile. In another more particular example, in the case of an automobile transponder key, the user can be prompted to provide a vehicle identification number (VIN) associated with the automobile to which the transponder key corresponds.

As another example, in some embodiments, process 1800 can prompt a user to present the transponder key for which information is to be detected to a camera. Process 1800 can use the output of the camera to determine at least a portion of information about the transponder key based on image data of one or more images of the transponder key. Such image data can include a shape of the key head, one or more logos associated with the transponder key, a shape and/or position of the shaft of the transponder key (if the transponder key includes a shaft), a bitting pattern of the transponder key (if the transponder key includes a bitting pattern), an overall shape of the transponder key, textual information associated with the transponder key and/or any other suitable information.

As yet another example, in some embodiments, process 1800 can prompt a user to present a registration document, title document and/or any other suitable document associated with an automobile to which the transponder key corresponds. Process 1800 can use textual information associated with such a document as received information related to the transponder key.

At 1806, process 1800 can detect a signal from the transponder key based on information related to the transponder key. In some embodiments, process 1800 can use the information related to the transponder key received at 1804 to determine an appropriate signal to emit to the transponder key to cause a responsive signal to be emitted by the transponder key and/or can determine likely properties of a signal emitted by the transponder key such that the transponder antenna can be tuned to an appropriate frequency (and/or any other suitable properties of the transponder antenna can be adjusted) to receive such a signal.

In some embodiments, process 1800 can submit a query to a database to determine an appropriate signal to send to the transponder key and/or properties of the signal emitted by the transponder key. Such a database can be organized using any suitable technique or combination of techniques. Process 1800 can, for example, provide the model, make and year of an automobile to which the transponder key corresponds, and information about an appropriate signal to emit to the transponder key and/or properties of the signal emitted by the transponder key can be provided from the database. In some embodiments, as described above in connection with FIG. 13, such a database can be maintained by a server (e.g., database 1316 stored in server 1310).

In some embodiments, process 1800 can cause a transponder antenna (e.g., transponder antenna 1302) to emit a signal based on the information related to the transponder key received at 1804. For example, such a signal can be a signal having properties retrieved from the database in response to a query based on information provided by the user.

In some embodiments, process 1800 can receive a signal from a transponder chip of the transponder key. Such a signal can be a response to a properly formatted signal emitted by transponder antenna 1302 and/or can be emitted by the transponder chip regardless of whether a properly formatted signal was emitted by transponder antenna 1302.

In some embodiments, prior to detecting a signal emitted by the transponder key, process 1800 can use any suitable sensor or sensors to determine that the transponder chip is within a threshold distance of the transponder antenna. For example, based on the information related to the transponder key, process 1800 can determine a maximum distance at which the transponder key can be disposed from the transponder antenna, and process 1800 can confirm that the transponder chip is less than the maximum distance from the transponder antenna. In a more particular example, based on the make, model and year of an automobile to which the transponder key corresponds, process 1800 can determine a maximum distance at a signal emitted by the transponder chip of the transponder key can be read. Process 1800 can then use a sensor (e.g., such as detectors 106) and information known about the geometry of the transponder key and the location of the transponder chip relative to a reference point that has a known position to determine whether the transponder chip is within the maximum range.

In some cases, certain transponder keys require reception of a signal that includes particular information before the transponder key emits a responsive signal. For example, certain active automobile transponder keys require reception of a signal including a particular code that is emitted by the automobile corresponding to the transponder key before emitting a responsive signal. Such a signal is often designed to be difficult to replicate as an additional safety measure to prevent illicit duplication of the transponder key from a distance as active transponder keys often have greater range than passive transponder keys and often work without a physical portion of the key, which could leave such keys vulnerable to illicit copying by a person that does not have physical access to the key. In such cases, process 1800 can, in some embodiments, determine whether the transponder key requires a signal from a corresponding device (e.g., the automobile) to emit the signal based on the received information related to the transponder key (e.g., a make, model and year of the automobile to which the transponder key corresponds). In some cases, further information, such as a trim level of an automobile may be required to determine whether the transponder key requires reception of a particular signal that cannot be readily replicated by kiosk 200 (or any other suitable device executing process 1800). For example, in some cases a less expensive trim level can use a passive transponder key, while a more expensive trim level may use an active transponder key.

In some embodiments, where the transponder key to be duplicated requires reception of a signal that includes particular information prior to emitting a responsive signal, process 1800 can instruct the user to carry a portable scanning device (e.g., including a power source, a transponder antenna, a hardware processor, one or more input mechanisms, etc.) associated with a computing device executing process 1800 (e.g., kiosk 200) to the device that emits the signal that includes the particular information (e.g., the automobile corresponding to the transponder key). In some embodiments, the portable scanning device can capture one or more signals emitted by the transponder key responsive to the signal emitted by, for example, the automobile. In some embodiments, the portable scanning device can include an input device (e.g., a button), and process 1800 can instruct a user to operate the input device (e.g., by pressing the button) when the user has brought the transponder key into the automobile and/or performed any other suitable actions (such as operating an ignition of the automobile). Process 1800 can present the user with any other suitable instructions for using the portable scanning device to capture one or more signals emitted by the transponder key. In some embodiments, the portable scanning device can communicate the one or more signals emitted by the transponder key and/or any suitable information encoded in the one or more signals emitted by the transponder key to the computing device executing process 1800 as data emitted by the transponder key.

At 1808, process 1800 can cause data based on a signal detected at 1806 to be used to identify a proper transponder chip and/or proper programming for a transponder chip to be used in creating a duplicate transponder key. In some embodiments, the data can include information encoded in the signal, such as a code which may or may not be encrypted. Any suitable technique or techniques can be used to identify the proper transponder chip and/or proper programming for a transponder chip. For example, process 1800 can use information encoded in the signal received from the transponder key to determine a proper transponder chip and/or proper programming for a transponder chip. In a more particular example, information encoded in the signal received from the transponder key can be used to identify properties of a transponder chip to be used in duplicating the transponder key.

In some embodiments, process 1800 can determine at least a portion of properties for a transponder chip to be used to duplicate the transponder key based on the information related to the transponder key received at 1804. For example, a particular transponder chip to be used to duplicate the transponder key and/or particular programming of a transponder chip to be used to duplicate the transponder key can be determined based on the make, model and year of an automobile to which the transponder key corresponds. In some cases, further information, such as a trim level may be required to determine a particular transponder chip to be used and/or particular programming of a transponder chip to be used. For example, in some cases a less expensive trim level can use a passive transponder key, while a more expensive trim level may use an active transponder key.

In some embodiments, process 1800 can cause information received in the signal emitted by the transponder key to be sent to a server (e.g., server 1310). In some embodiments, server 1310 can use the information related to the transponder key to determine whether the information received from the transponder key is encrypted and/or can decrypt the information received from the transponder key.

At 1810, process 1800 can cause key information that can be used to duplicate the transponder key to be stored and/or used to create a duplicate of the transponder key. For example, process 1800 can cause geometric information about a shaft portion of the transponder key (if such a shaft portion exists) and the properties of a transponder chip to be used to duplicate the signal emitted by the transponder chip of the transponder key to be sent to a server (e.g., server 1310). As described above in connection with FIG. 13, server 1310 can cause the information to be stored (e.g., in a database of key information) and/or can cause the information to be used to create a duplicate of the transponder key. This information can be encrypted on server 1310 and/or when being transmitted between a device executing process 1800 and server 1310.

In some embodiments, process 1800 can operate in conjunction with process 300 described above in connection with FIG. 3 to scan a transponder key, duplicate a transponder key, and/or store information for duplicating a transponder key.

In some embodiments, server 1310 can receive a request from a kiosk (e.g., kiosk 200) and/or any other suitable computing device (e.g., a smartphone, a personal computer, etc.) to create a duplicate of a particular transponder key. As described above in connection with FIG. 13, server 1310 can access the information required to create the duplicate transponder key and can initiate any suitable process for creating and/or delivering the duplicate to a location specified by the user. For example, server 1310 can determine a key type of blank having an appropriate transponder chip and can identify a code to be programmed onto the key blank based on the code included in the signal received from the transponder key.

In some embodiments, at least a portion of process 1800 can be executed by any device that includes suitable hardware for detecting one or more signals from the transponder key. For example, a smartphone or tablet computer can include an antenna, such as transponder antenna 1302 (and/or any other suitable antenna) and any associated hardware that can be used for detecting one or more signals from the transponder key (e.g., as described above in connection with 1806). As another example, a smartphone or tablet computer can communicate with separate hardware (e.g., a dongle, a handheld device, etc.) that includes an antenna and/or any associated hardware that can be used for detecting one or more signals from the transponder key. Such hardware can communicate with the smartphone or tablet using any suitable communication protocol, such as wired communication through a headphone jack connection to the smartphone or tablet, wired communication through a USB connection to the smartphone or tablet, wired communication using a proprietary connector (e.g., an APPLE LIGHTING connector) to connect to the smartphone or tablet, wireless communication through a BLUETOOTH connection, and/or through any other suitable connection. Note that smartphones and tablet computers are merely used as examples, and any suitable computing device having appropriate hardware (and/or coupled to appropriate hardware) for detecting a signal from the transponder key can be used to execute at least a portion of process 1800. In such examples, at least a portion process 1800 can be executed by an application executed by the device and/or can be executed using a web browser that accesses a web page that causes the device to execute at least a portion of process 1800.

In some embodiments, the mechanisms described herein can include server-side software, client-side software, server-side hardware, client-side hardware, client-side firmware, server-side firmware, or any suitable combination thereof. For example, these mechanisms can encompass one or more web pages or web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor (such as hardware processor 110, hardware processor 1702 and/or hardware processor 1722) to execute the mechanisms described herein. For instance, these mechanisms can encompass a computer program (such as a mobile application, a computer application and/or a server application) written in a programming language recognizable by kiosk 200, mobile device 1602, and/or server 1310 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, BLU-RAY discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for scanning a transponder key, the system comprising:
   a self-service kiosk for use by a consumer user comprising:
      an antenna;
      a touchscreen; and
      at least one hardware processor that is programmed to:
         receive, via the touchscreen, a request from the user of the self-service kiosk to scan a transponder key;
         receive, via the touchscreen, information related to the transponder key;
         determine signal properties associated with the transponder key based on the received information related to the transponder key;
         cause the antenna to emit a first signal based on the determined signal properties;
         detect a second signal that is transmitted by the transponder key in response to the first signal, based on the determined signal properties;
         receive, via the touchscreen, an instruction to create a duplicate of the transponder key;
         receive, via the touchscreen, location information to which the duplicate of the transponder key is to be delivered;
         cause information encoded in the second signal to be used to create the duplicate of the transponder key; and
         cause the duplicate of the transponder key to be delivered based on the location information.

2. The system of claim 1, wherein the at least one hardware processor is further programmed to confirm that a position of the transponder key is within a threshold distance of the antenna.

3. The system of claim 1, wherein the kiosk further comprises:
   a key slot disposed in a surface of the kiosk, wherein the antenna is positioned such that a key head of the transponder key at least partially inserted into the key slot is proximate to the antenna; and
   an image sensor that captures an image of the transponder key at least partially inserted into the key slot;
   wherein the at least one hardware processor is further programmed to:
      determine geometric information about the transponder key based on the image of the transponder key captured by the image sensor; and
      cause the geometric information about the transponder key to be used to create the duplicate of the transponder key.

4. The system of claim 1, wherein the transponder key is a key for an automobile and the information related to the transponder key includes the make, model and year of the automobile.

5. The system of claim 1, wherein the location information includes at least a mailing address.

6. The system of claim 3, wherein the hardware processor is further programmed to:
   cause the information encoded in the second signal to be stored in a storage device in association with the geometric information; and
   cause the information encoded in the second signal and the geometric information about the transponder key to be retrieved from the storage device.

7. The system of claim 1, wherein the hardware processor is further programmed to determine the information encoded in the second signal.

8. A method for scanning a transponder key, the method comprising:
   receiving from a consumer user via a touchscreen of a self-service kiosk a request from the user of the self-service kiosk to scan a transponder key;
   receiving, via the touchscreen, information related to the transponder key;
   determining signal properties associated with the transponder key based on the received information related to the transponder key;
   causing an antenna to emit a first signal based on the determined signal information;
   detecting a second signal transmitted by the transponder key in response to the first signal, based on the determined signal properties;
   receiving, via the touchscreen, an instruction to create a duplicate of the transponder key;
   receiving, via the touchscreen, location information to which the duplicate of the transponder key is to be delivered;
   causing information encoded in the second signal to be used to create the duplicate of the transponder key; and
   causing the duplicate of the transponder key to be delivered based on the location information.

9. The method of claim 8, further comprising confirming that a position of the transponder key is within a threshold distance of the antenna.

10. The method of claim 8, further comprising:
    receiving an image of the transponder key captured by an image sensor included in the kiosk;
    determining geometric information about the transponder key based on the image of the transponder key captured by the image sensor; and
    causing the geometric information about the transponder key to be used to create the duplicate of the transponder key.

11. The method of claim 8, wherein the transponder key is a key for an automobile and the information related to the transponder key includes the make, model and year of the automobile.

12. The method of claim 8, wherein the location information includes at least a mailing address.

13. The method of claim 10, further comprising:
    causing the information encoded in the second signal to be stored in a storage device in association with the geometric information; and
    causing the information encoded in the second signal and the geometric information about the transponder key to be retrieved from the storage device.

14. The method of claim 8, further comprising determining the information encoded in the second signal.

15. A system for duplicating a transponder key, the system comprising:

at least one hardware processor that is programmed to:

receive, from a kiosk, a request for signal properties for interrogating a transponder key;

receive, from the kiosk, consumer-user-provided information about the transponder key;

determine signal properties associated with the transponder key using the information about the transponder key, wherein the signal properties include at least a format of a signal that is used to activate the transponder key;

send, to the kiosk, the signal properties associated with the transponder key;

receive, from the kiosk, encoded information included in a signal received by the kiosk from the transponder key;

receive location information;

identify a key blank based on the information about the transponder key;

create a duplicate of the transponder key using the encoded information; and cause the duplicate of the transponder key to be delivered based on the location information.

16. The system of claim 15, wherein the location information includes at least a mailing address.

17. The system of claim 16, wherein the location information is received from the kiosk.

18. The system of claim 16, wherein the location information is retrieved from a storage device based on identifying information received from the kiosk.

19. The system of claim 15, wherein the at least one hardware processor is further configured to:

receive identifying information from the kiosk that identifies a user; and store the encoded information in a storage device in association with an account of the user.

20. The system of claim 15, wherein the at least one hardware processor is further programmed to program a transponder chip in the key blank based on the encoded information.

\* \* \* \* \*